United States Patent
Babiniec et al.

(10) Patent No.: US 11,339,766 B2
(45) Date of Patent: May 24, 2022

(54) REDOX-ACTIVE OXIDE MATERIALS FOR THERMAL ENERGY STORAGE

(71) Applicant: National Technology & Engineering Solutions of Sandia, LLC, Albuquerque, NM (US)

(72) Inventors: Sean M. Babiniec, Arvada, CO (US); Andrea Ambrosini, Albuquerque, NM (US); Eric N. Coker, Albuquerque, NM (US); James E. Miller, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/574,169

(22) Filed: Sep. 18, 2019

(65) Prior Publication Data
US 2020/0048106 A1 Feb. 13, 2020

Related U.S. Application Data

(60) Division of application No. 15/170,314, filed on Jun. 1, 2016, now Pat. No. 10,800,665, and a (Continued)

(51) Int. Cl.
*C01G 45/12* (2006.01)
*C01G 49/00* (2006.01)
(Continued)

(52) U.S. Cl.
CPC .......... *F03G 6/003* (2013.01); *C01G 45/125* (2013.01); *C01G 45/1264* (2013.01); (Continued)

(58) Field of Classification Search
CPC .. C01G 45/125; C01G 49/009; C01G 51/006; C01G 45/1264; F28D 20/003; (Continued)

(56) References Cited

U.S. PATENT DOCUMENTS 7,071,141 B2   7/2006   Gandhi et al.
7,928,637 B2   4/2011   Comyn et al.
(Continued)

FOREIGN PATENT DOCUMENTS

| CN | 103372446 A | * 10/2013 |
| JP | 6315634 A | 11/1994 |
| JP | 2014154778 A | * 8/2014 |

OTHER PUBLICATIONS

Scheffe, Jonathan R., David Weibel, and Aldo Steinfeld. "Lanthanum-strontium-manganese perovskites as redox materials for solar thermochemical splitting of H2O and CO2." Energy & Fuels 27.8 (2013): 4250-4257.*
(Continued)

*Primary Examiner* — Richard M Rump
(74) *Attorney, Agent, or Firm* — Daniel J. Jenkins

(57) ABSTRACT

Thermochemical storage materials having the general formula $A_xA'_{1-x}B_yB'_{1-y}O_{3-\delta}$, where A=La, Sr, K, Ca, Ba, Y and B=Mn, Fe, Co, Ti, Ni, Cu, Zr, Al, Y, Cr, V, Nb, Mo, are disclosed. These materials have improved thermal storage energy density and reaction kinetics compared to previous materials. Concentrating solar power thermochemical systems and methods capable of storing heat energy by using these thermochemical storage materials are also disclosed.

13 Claims, 11 Drawing Sheets

Related U.S. Application Data continuation-in-part of application No. 14/846,201, filed on Sep. 4, 2015, now Pat. No. 10,107,268.

(60) Provisional application No. 62/169,109, filed on Jun. 1, 2015, provisional application No. 62/046,725, filed on Sep. 5, 2014.

(51) Int. Cl.

| | |
|---|---|
| *C01G 51/00* | (2006.01) |
| *F03G 6/00* | (2006.01) |
| *F03G 6/06* | (2006.01) |
| *C09K 5/16* | (2006.01) |
| *F28D 20/00* | (2006.01) |

(52) U.S. Cl.
CPC ......... *C01G 49/009* (2013.01); *C01G 51/006* (2013.01); *C09K 5/16* (2013.01); *F03G 6/064* (2013.01); *F28D 20/003* (2013.01); *C01P 2002/34* (2013.01); *C01P 2002/72* (2013.01); *C01P 2006/90* (2013.01); *Y02E 10/46* (2013.01)

(58) Field of Classification Search
CPC .... C09K 5/16; C01P 2002/34; C01P 2002/72; C01P 2006/90
See application file for complete search history.

(56) References Cited

U.S. PATENT DOCUMENTS

| | | |
|---|---|---|
| 2009/0035635 A1 | 2/2009 | Bae et al. |
| 2010/0255387 A1* | 10/2010 | Ramanathan ....... H01M 8/1246 429/408 |
| 2011/0253204 A1* | 10/2011 | Koshibae ............ H01L 31/0725 136/255 |

OTHER PUBLICATIONS

McDaniel, Anthony H., et al. "Nonstoichiometric perovskite oxides for solar thermochemical H2 and CO production." Energy Procedia 49 (2014): 2009-2018.*

Jiang, Qingqing, et al. "Thermochemical CO2 splitting reaction with supported LaxA1—xFeyB1—yO3 (A= Sr, Ce, B= Co, Mn; 0 x, y1) perovskite oxides." Solar energy 103 (2014): 425-437.*

Ambrosini, A. et al., "Synthesis and characterization of the double-substituted perovskites LaxSr1—xCo1—yMnyO3—δ for use in high-temperature oxygen separations," Solid State Ionics (2006) 177:2275-2279.

Kusaba, H. et al., "Surface effect on oxygen permeation through dense membrane of mixed-conductive LSCF perovskite-type oxide," Solid State Ionics (2006) 177:2249-2253.

Lee, Y. N. et al., "Synthesis and surface characterization of nanometric La1—xKxMnO3+δ particles," Catalysis Today (1999) 52:45-52.

Neetika, A. D. et al., "Transport and magnetic properties of Fe doped CaMnO3," Journal of Applied Physics (2012) 112:123913, 6 pages.

Prado, F. et al., "Discontinuous Evolution of the Highly Distorted Orthorhombic Structure and the Magnetic Order in LaMnO3±δ Perovskite," Journal of Solid State Chemistry (1999) 146:418-427.

Taniguchi, K. et al., "Preparation and characterization of La1—xKxFeO3(x= 0-1) by self-propagatinghigh-temperature synthesis for use as soot combustion catalyst," Journal of Alloys and Compounds (2011) 509:4084-4088.

* cited by examiner

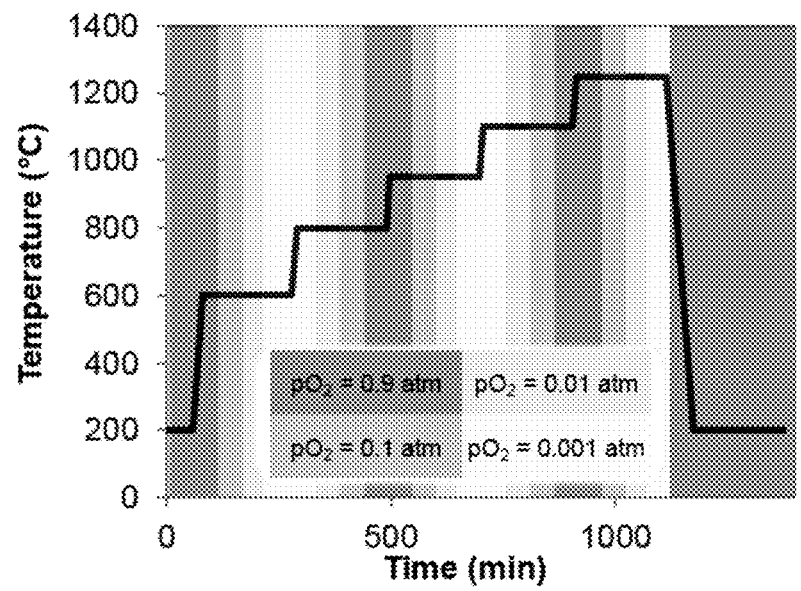
Figure 3
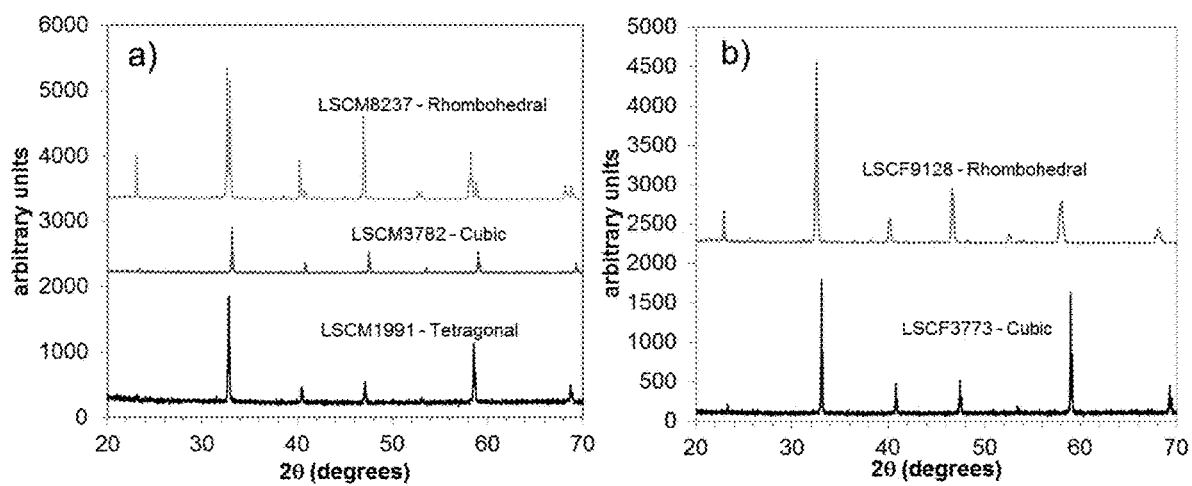
Figure 4A
Figure 4B

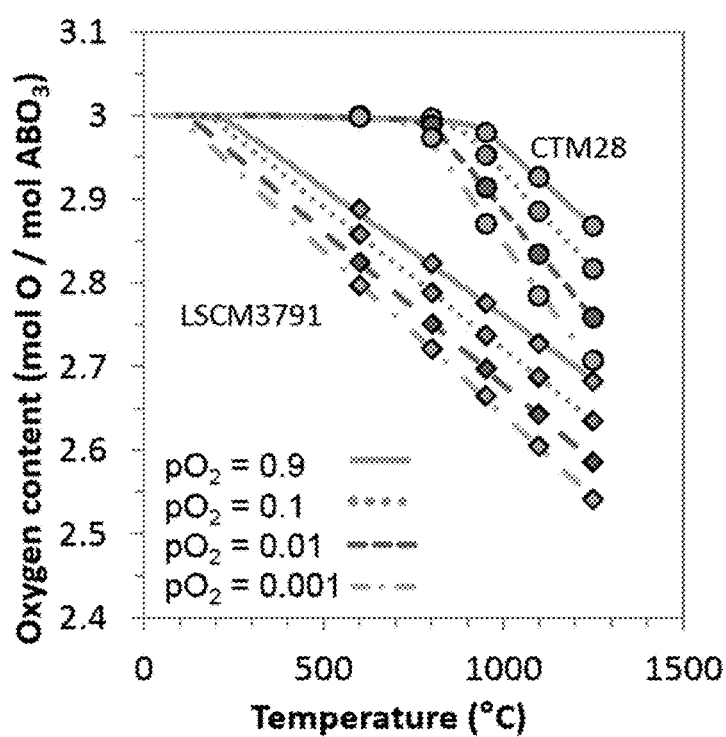
Figure 15
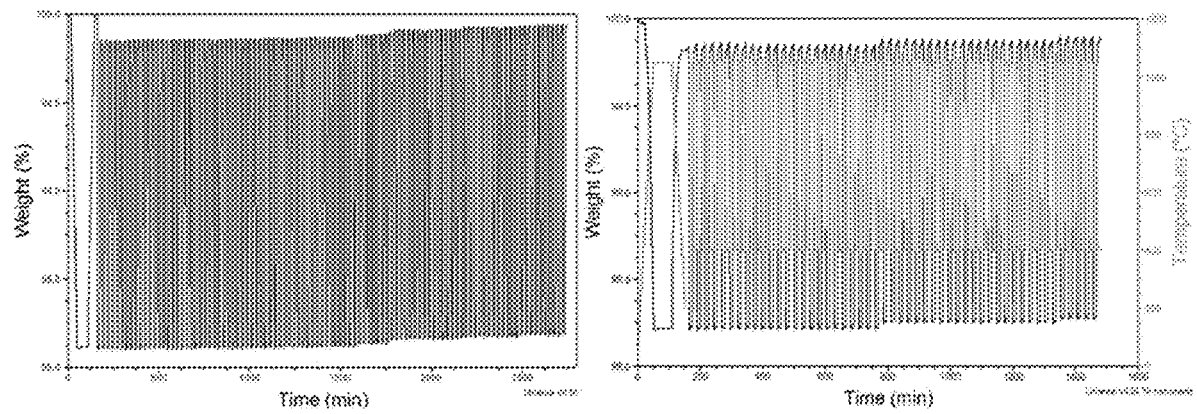
Figure 16A
Figure 16B

REDOX-ACTIVE OXIDE MATERIALS FOR THERMAL ENERGY STORAGE

RELATED APPLICATIONS

This application is a divisional of U.S. patent application Ser. No. 15/170,314, entitled "REDOX-ACTIVE OXIDE MATERIALS FOR THERMAL ENERGY STORAGE," filed Jun. 1, 2016, which claims priority to U.S. Provisional Patent Application No. 62/169,109, entitled "REDOX-ACTIVE OXIDE MATERIALS FOR THERMAL ENERGY STORAGE," filed Jun. 1, 2015 and is a Continuation-In-Part of U.S. patent application Ser. No. 14/846,201, entitled "THERMAL ENERGY STORAGE AND POWER GENERATION SYSTEMS AND METHODS," filed on Sep. 4, 2015, which claims priority to U.S. Provisional Patent Application No. 62/046,725, entitled "REDOX-ACTIVE OXIDE MATERIALS FOR THERMAL ENERGY STORAGE," filed Sep. 5, 2014, the disclosures of which are incorporated herein in their entirety.

GOVERNMENT RIGHTS

The Government has rights to this invention pursuant to Contract No. DE-AC04-94AL85000 awarded by the U.S. Department of Energy and Contract No. DE-NA0003525 awarded by the United States Department of Energy/National Nuclear Security Administration.

FIELD

The invention relates generally to energy storage, and more particularly to materials for thermochemical energy storage (TCES) and solar power systems.

BACKGROUND OF THE INVENTION

The desire to decrease and ultimately eliminate dependence on fossil fuels has stimulated research into clean and renewable ways to produce electricity for the global marketplace. Solar power is a viable option to fulfill this goal because it is a clean, carbon-free form of energy production, and there is a potentially limitless supply of solar radiation.

Technological innovations and improvements have helped to make solar power generation a feasible means for large scale power production. More specifically, the reduction in the capital investment required and the reduction in recurring operation and maintenance costs allow solar power generation to compete with other forms of power generation.

To address the demand for solar power systems, many configurations have been designed and implemented. One such implementation is a concentrating solar power (CSP) system that collects and concentrates solar energy onto an absorber whereby it is converted to heat. A thermal carrier, for example a fluid such as an oil or molten salt, can be used to transport the heat, for example by pumping, to a power conversion system. The power conversion system utilizes the heat to produce electricity that can be fed into an electrical grid or other system. The thermal carrier is cycled indefinitely between the absorber and the power conversion system.

The development of heat storage materials to extend and/or shift electricity generation duration during cloud transients, periods of high demand, and nighttime, is of crucial importance. Currently, state-of-the-art CSP plants employ molten salts as the heat transfer and energy storage medium; salts of this type store energy only as sensible heat. Molten salts have several limitations, including low decomposition temperature (currently <650° C.) and low energy density (~490 kJ/kg). Alternatively, thermochemical energy storage (TCES), in which heat is stored as both sensible heat and latent heat in the form of chemical bonds, has been demonstrated in metal-oxide redox pairs, such as cobalt and manganese oxides. In these materials, thermal energy is stored as both chemical and sensible energy by causing the material to undergo a discrete compositional phase change, such as:

$$M_3O_4 + \Delta H \leftrightarrow 3MO + \tfrac{1}{2}O_2(g) \qquad \text{(Equation 1)}$$

where M is the metal cation or cations (e.g., Co, Mn) and ΔH is the energy consumed or released by the reaction depending on the direction in which the reaction is proceeding.

However, such discrete compositional phase changes often suffer from sluggish kinetics resulting in inefficient heat uptake and release, incomplete reactions, practical irreversibilities, and unfavorable temperatures of heat uptake and release.

What are needed are thermochemical energy storage materials that have high energy density, rapid kinetics, and low cost.

SUMMARY OF THE INVENTION

According to an embodiment of the disclosure, thermochemical energy storage (TCES) materials having the formula $A_xA'_{1-x}B_yB'_{1-y}O_{3-\delta}$, where A=La, Sr, K, Ca, Ba, Y and B=Mn, Fe, Co, Ti, Ni, Cu, Zr, Al, Y, Cr, V, Nb, Mo, and where $0 \leq x \leq 1$, $0 \leq y \leq 1$ and $0 \leq \delta \leq 1$ are disclosed.

According to another embodiment of the disclosure, methods and systems using TCES materials of the formula $A_xA'_{1-x}B_yB'_{1-y}O_{3-\delta}$ where A=La, Sr, K, Ca, Ba, Y and B=Mn, Fe, Co, Ti, Ni, Cu, Zr, Al, Y, Cr, V, Nb, Mo, and $0 \leq x \leq 1$, $0 \leq y \leq 1$, and $0 \leq \delta \leq 1$ for TCES are disclosed.

According to an embodiment of the disclosure, TCES materials of the formula $Ca_xA'_{1-x}Mn_yB'_{1-y}O_{3-\delta}$, where A'=Sr, La, Y, Ba and B'=Al, Ti, V, Cr, Fe, Co, Cu, Zr, Nb, Mo, Ce, and $0 \leq x \leq 1$, $0 \leq y \leq 1$, and $0 \leq \delta \leq 1$ are disclosed.

According to another embodiment of the disclosure, methods and systems for using TCES materials of the formula $Ca_xA'_{1-x}Mn_yB'_{1-y}O_{3-\delta}$, where A'=Sr, La, Y, Ba and B'=Al, Ti, V, Cr, Fe, Co, Cu, Zr, Nb, Mo, Ce, and $0 \leq x \leq 1$, $0 \leq y \leq 1$, and $0 \leq \delta \leq 1$ for TCES are disclosed.

According to another embodiment of the disclosure, TCES materials having the formula $La_xSr_{1-x-y}K_yCo_zM_{1-z}O_{3-\delta}$, where M=Mn or Fe, and $0 \leq x \leq 1$, $0 \leq y \leq 1$, $0 \leq z \leq 1$, and $0 \leq \delta \leq 1$ are disclosed.

According to another embodiment of the disclosure, methods and systems for using TCES materials of the formula $La_xSr_{1-x-y}K_yCo_zM_{1-z}O_{3-\delta}$, where M=Mn or Fe, and $0 \leq x \leq 1$, $0 \leq y \leq 1$, $0 \leq z \leq 1$, and $0 \leq \delta \leq 1$ are disclosed.

Throughout this disclosure, δ denotes the variation in oxygen stoichiometry relative to the standard $ABO_3$ composition and is a measure of the extent of reduction of the material. A change in δ (i.e. Δδ, generally reported as a positive number for both reduction and oxidation) represents the moles of oxygen lost or gained per mole of material as it is reduced and oxidized typically in a cyclic fashion. That is, Δδ is a measure of the redox capacity of the material. Expected values are $0 \leq \delta \leq 1$; most typically $0 \leq \delta \leq 0.5$ and $0.2 \leq \delta \leq 0.5$.

An object of the present invention is to provide TCES materials having an improved thermal storage energy density.

Another object of the present invention is to provide TCES materials having improved reaction kinetics.

Another object of the present invention is to provide materials for ICES which can be tuned via composition to a desired operating range.

Another object of the present invention is to extend the applicable range of thermal energy storage to >1000° C.

Another object of the present invention is to provide TCES materials having reduced cost.

Another object of the present invention is to provide TCES materials devoid of or with minimal usage of rare-earth elements.

Another object of the present invention is to provide TCES materials with minimum molecular weight.

Another object of the present invention is to develop reactor systems that effectively achieve the collection and storage of thermal energy at high temperatures utilizing the compositions disclosed herein, allowing for overall higher efficiencies in electricity production.

Another object of the present invention is to provide cost efficient and effective methods to produce electricity from collected solar energy.

An advantage of the present invention is increased storage density relative to sensible-only energy storage.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instruments and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 2B shows terminology of measured changes in oxygen non-stoichiometry ($\Delta\delta_1, \Delta\delta_2, \Delta\delta_3$) from the second TGA cycle following the break-in.

FIG. 3 shows a schematic representation of the temperature and gas composition profiles for more detailed equilibrium TGA experiments applicable to extraction of thermodynamic parameters for the materials.

FIG. 4A shows X-Ray Diffraction (XRD) patterns of representative LSCM compositions.

FIG. 4B shows XRD patterns of representative LSCF compositions.

FIG. 15 shows oxygen content (i.e., values of 3-$\delta$) as a function of temperature and gas phase oxygen partial pressure (in atmospheres) taken from equilibrium experiment data for LSCM3791 and CTM28. Symbols denote equilibrium data and lines denote curve fits.

FIG. 16A shows 100 thermal TGA cycles under air for LSCM3791.

FIG. 16B shows 50 TGA cycles under air for CAM28.

DETAILED DESCRIPTION OF THE INVENTION

Figure 1:
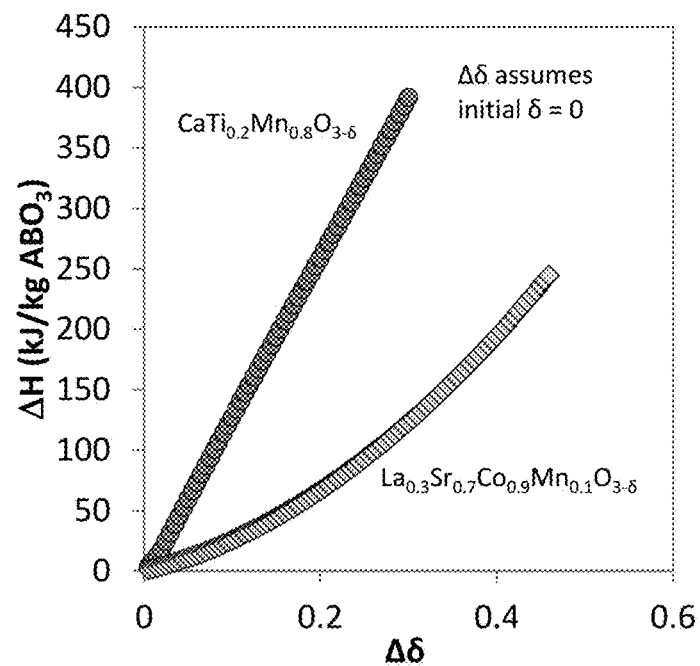
FIG. 1 shows a comparison of thermodynamic performance of $La_{0.3}Sr_{0.7}Co_{0.9}Mn_{0.1}O_{3-\delta}$ (LSCM3791) with $CaTi_{0.2}Mn_{0.8}O_{3-\delta}$ (CTM28) The y-axis represents the cumulative energy stored that is attributable to the reduction enthalpy as the reaction proceeds from the fully oxidized state ($\delta=0$) to the $\delta$ shown on the x-axis (i.e. $\Delta\delta$).

The present disclosure is directed toward perovskite thermochemical energy storage (TCES) materials and methods of using perovskite TCES materials for CSP energy storage.

The present disclosure is also directed to TCES systems using the disclosed TCES materials and compositions. According to an embodiment of the disclosure, the disclosed perovskite TCES material can be used in a TCES system, such as the system disclosed in U.S. patent application Ser. No. 14/846,201, entitled "THERMAL ENERGY STORAGE AND POWER GENERATION SYSTEMS AND METHODS," filed on Sep. 4, 2015, the disclosure of which is incorporated herein in its entirety.

The disclosed materials may be used in other TCES systems and other thermochemical reactors or systems, such as concentrated solar falling particle receivers, fluidized bed receivers, conveyor receivers, and other receivers as known in the art.

Perovskites are generally described as having a basic $ABO_3$ stoichiometry, where A and B are different cation sites, and O is oxygen. The actual oxygen stoichiometry of the material can vary from 3 in order to exactly balance the charges of A and B. Thus the stoichiometry is more precisely described as $ABO_{3-\delta}$ where $\delta$ denotes the variation in oxygen stoichiometry relative to the standard $ABO_3$ composition and is a measure of the oxidation state of the cations. A change in $\delta$ (i.e. $\Delta\delta$, reported here as a positive number) represents the moles of oxygen lost or gained per mole of material as it is reduced or oxidized and is a measure of the reaction extent or redox capacity of the material. In an embodiment, $\delta$ and $\Delta\delta$ may range from 0 to 1, which may be written, for example as $0 \leq \delta \leq 1$. In another embodiment, $\delta$ may range from 0.0 to 0.5 and $\delta\Delta$ during cycling from 0.1 to 0.6. In another embodiment, $\delta$ may range from 0.0 to 1 and $\delta\Delta$ during cycling from 0.1 to 1. Multiple different cations may reside on both the A and B sites, and cation substitutions can be made in each site, denoted as A' and B'. According to the present disclosure, the following approaches (see I,II,III below) have been used to manipulate the energy storage capacity in the $A_xA'_{1-x}B_yB'_{1-y}O_{3-\delta}$ perovskite oxide materials disclosed herein.

(I) B-site oxidation state: If the enthalpy associated with the formation of oxygen vacancies is unchanged between two materials, it is beneficial to increase the extent of reduction ($\Delta\delta$, or $\delta$ if the initial state is $\delta=0$ as shown in equation 2A).

$$ABO_3 + \Delta H \leftrightarrow ABO_{3-\delta} + \delta/2 O_2(g) \quad \text{(Eqn. 2A)}$$

The formation of oxygen vacancies is subject to the availability of reducible cations to balance the charge of an oxygen vacancy:

$$2M_M^x \leftrightarrow 2M_{M'} + V_{O''} \quad \text{(Eqn. 2B)}$$

where $M_M^x$ is a B-site metal cation, $M_{M'}$ is a reduced B-site cation, and $V_{O''}$ is an oxygen vacancy. In order to maximize $\delta$, it is beneficial to engineer the material so that the B-site average oxidation state is as high as possible, resulting in a higher concentration of reducible cation sites. This can be done by A-site substitution of non-labile cations, i.e., a +2 cation for a +3 cation on the A-site, which requires the B-site oxidation state to increase in order to maintain charge neutrality since the summation of the charge of the cations must balance that of the oxygen anions.

(II) Molecular weight: A reduction in molecular weight increases the total mass-specific enthalpy by increasing both the sensible enthalpy (more atoms per unit mass) and the latent enthalpy (more bonds per unit mass). Furthermore, less work is expended in transporting the material, e.g. from cold storage to the receiver, reducing parasitic energy losses.

(III) Reduction onset temperature: There is a thermodynamic relationship between the temperature required to drive the material to a more reduced state relative to the current state and the enthalpy of that reduction ($\Delta H$). If a material is easier to reduce than another (i.e. reduction occurs at a lower temperature), it is often because the metal oxygen bond strength and hence the enthalpy of reduction is smaller as well. However, the total energy stored is combination of the reduction enthalpy and the extent of reduction. Therefore, it is desirable to design materials that are difficult to reduce (have strong bonds), but still display reasonable extent of reduction at elevated temperatures.

The present disclosure is directed to metal oxide particles formed from TCES materials having the general formula $A_xA'_{1-x}B_yB'_{1-y}O_{3-\delta}$, where A=La, Sr, K, Ca, Ba, Y and B=Mn, Fe, Co, Ti, Ni, Cu, Zr, Al, Y, Cr, V, Nb, Mo. Generally, the A-site cations are chosen to engineer the phase stability of the material and influence the B-site oxidation state, and the B-site cations are chosen as the redox-active cations, allowing for the generation of oxygen vacancies. In this formulation, A' and B' represent substituent cations, i.e., if Sr replaced a portion of the La on the A-site, then A=La and A'=Sr.

According to an embodiment of the disclosure, $La_xSr_{1-x}Co_yMn_{1-y}O_{3-\delta}$ (LSCM), $La_xSr_{1-x}Co_yFe_{1-y}O_{3-\delta}$ (LSCF), A-site potassium substituted LSCM (LSKCM), and metal cation substituted calcium manganite perovskites ($CaA'MnB'O_{3-\delta}$) are disclosed. Potassium doping onto the A-site of the LSCM perovskite addresses two of the target properties listed above, 1) an increase in the B-site oxidation state, and 2) a reduction in the molecular weight.

Substituted calcium manganites address all three of the target properties listed above. Using a lower-valence cation, such as Ca +2, drives the B-site to a higher oxidation state in fully oxidized materials, theoretically increasing the potential reduction magnitude. The use of calcium on the A-site reduces the molecular weight up to 35% when compared to LSCM/LSCF. Additionally, previous studies have shown that $CaMnO_{3-\delta}$ materials reduce at high temperatures (~800° C.). In another embodiment, non-labile cations such as Al and Ti may be substituted onto the B-site, increasing the enthalpy by increasing the bond strength between such elements and oxygen. Substituted-calcium manganites also provide one additional key benefit: reduction of cost. Calcium precursors are much cheaper than lanthanum or strontium precursors, which can greatly reduce the cost of storage per unit of energy.

According to an embodiment of the present disclosure, high-performing substituted calcium manganite perovskites, which may be referred to as $CaA'MnB'O_{3-\delta}$, having the formula: $Ca_xA'_{1-x}Mn_{1-y}B'_yO_{3-\delta}$, where A'=Sr, La, Y, Ba and B'=Al, Ti, V, Cr, Fe, Co, Cu, Zr, Nb, Mo, Ce are disclosed. The heat storage capacity is a function of M, the enthalpy of reduction, and the heat capacity of the oxide. A large reaction extent, M, is beneficial to the storage capacity, provided it does not come at the expense of a small reduction enthalpy.

The widely accepted nomenclature of perovskite compounds, which is used here, is to list the initials of the elements followed by the stoichiometry of the compound eliminating the decimals. For example, $La_{0.1}Sr_{0.9}Co_{0.8}Mn_{0.2}O_{3-\delta}$ is referred to as LSCM1982.

Substituted calcium manganite possesses unique advantages over other perovskites of interest for TCES:

The material is devoid of rare-earth elements, resulting in highly available precursors and lower materials cost.

The material exhibits high redox enthalpies correlated with high reduction onset temperatures, even at a lower extent-of-reduction as compared to other perovskite TCES candidates.

The material displays redox reversibility up to at least 1250° C. in argon and air.

The material exhibits a reduced molecular weight as compared to state-of-the-art LSCM/LSCF compositions.

The presently disclosed substituted calcium manganites significantly outperform previous state-of-the-art perovskite materials, such as $La_{0.3}Sr_{0.7}Co_{0.9}Mn_{0.1}O_{3-\delta}$ (LSCM3791). FIG. 1 shows a comparison of $CaTi_{0.2}Mn_{0.8}O_{3-\delta}$ (CTM28) and LSCM3791, the independent axis representing the oxygen stoichiometry ($\delta$) and the dependent axis representing the cumulative reaction enthalpy stored (kJ/kg of perovskite) as the material is reduced from the fully oxidized state ($\delta=0$) to the $\delta$ shown on the x-axis (i.e. $\Delta\delta$). Although CTM28 reduces to a lesser extent under similar conditions than LSCM3791, the chemical energy stored is much greater.

As can be seen in FIG. 1, CTM28 has a significantly greater reaction enthalpy as compared to the state-of-the-art LSCM3791.

Novel substituted calcium manganite perovskites for this application include: $CaTi_{0.2}Mn_{0.8}O_{3-\delta}$, $CaTi_{0.4}Mn_{0.6}O_{3-\delta}$, $Ca_{0.8}Sr_{0.2}Ti_{0.2}Mn_{0.8}O_{3-\delta}$, $Ca_{0.8}La_{0.2}Ti_{0.2}Mn_{0.8}O_{3-\delta}$, $Ca_{0.9}Y_{0.1}MnO_{3-\delta}$, $Ca_{0.8}Y_{0.2}MnO_{3-\delta}$, $Ca_{0.7}Y_{0.3}MnO_{3-\delta}$, $Ca_{0.9}Y_{0.1}Al_{0.2}Mn_{0.8}O_{3-\delta}$, $CaAl_{0.2}Mn_{0.8}O_{3-\delta}$, $CaCo_{0.2}Mn_{0.8}O_{3-\delta}$, and $CaFe_{0.2}Mn_{0.8}O_{3-\delta}$.

$ABO_3$ stoichiometry ($\delta=0$), and $MW_o$ is the molecular weight of monatomic oxygen.

The second TGA method involved obtaining equilibrium measurements of mass over a range of temperatures and oxygen partial pressures. This data serves to verify the initial results and to provide a measure of the redox thermodynamics and reproducibility. These were performed using a Netzsch STA449F3 Jupiter TGA. Following a single break-in cycle and an initial mass measurement at a temperature of 200° C. and oxygen partial pressure ($pO_2$) of 0.9 atm, samples were given adequate time to equilibrate at temperatures of 600, 800, 950, 1100, and 1250° C. repeated at $pO_2$ of 0.9, 0.1, 0.01, and 0.001 atm. For clarity, a schematic representation of the experimental profile is shown in FIG. 3.

Table 1 lists synthesized examples from each material family analyzed and their measured properties. The redox capacity is taken from the value of 463 value from the pre-screen TGA.

TABLE 1

Comparison of representative redox properties for each materials family.

| Perovskite family | Crystal phase(s) | Molecular weight (g/mol) | Redox capacity ($\Delta\delta_3$) | Representative reduction onset in air (° C.) | TCES material |
|---|---|---|---|---|---|
| LSCM | Tetragonal, cubic, rhombohedral, orthorhombic | 195-240 | 0.00-0.39 | 325-450 | LSCM1991, LSCM3791, LSCM3782 |
| LSCF | Cubic, rhombohedral, orthorhombic | 195-240 | 0.01-0.40 | 300-400 | LSCF2882, LSCF3791, LSCF3773 |
| BSCF | Melted below 1200° C. | 195-240 | N/A | N/A | low melting point |
| LSMF | Tetragonal, cubic | 195-240 | 0.14-0.26 | 375-500 | smaller $\Delta\delta_3$ than similar LSCM, LSCF |
| LSKCM | Cubic | 200 | 0.37 | 365 | LSKCM27191 |
| CaA'MnB' | Tetragonal, orthorhombic | 135-160 | 0.09-0.31 | 400-1100 | CAM28, CTM28, CYM91, CYAM9128 |

Experimental Description

The perovskites were synthesized by a modified Pechini method to ensure complete mixing of the reactants. The crystallographic structure and phase composition of the calcined pellets were examined by powder x-ray diffraction (XRD). Crystal structure was determined by analyzing XRD patterns using Jade 9 software (Materials Data Inc. Jade+, Livermore, Calif.).

Figure 2A:
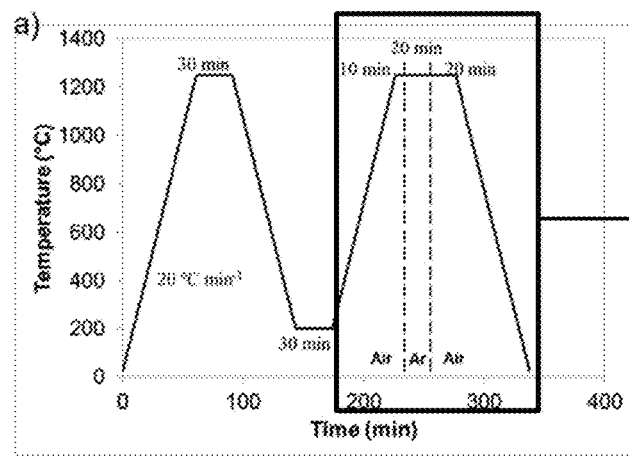
FIG. 2A illustrates a typical Thermogravimetric Analysis (TGA) profile used to collect preliminary (prescreen) data for comparative analysis of the reduction/oxidation properties of each material.
Figure 2B:
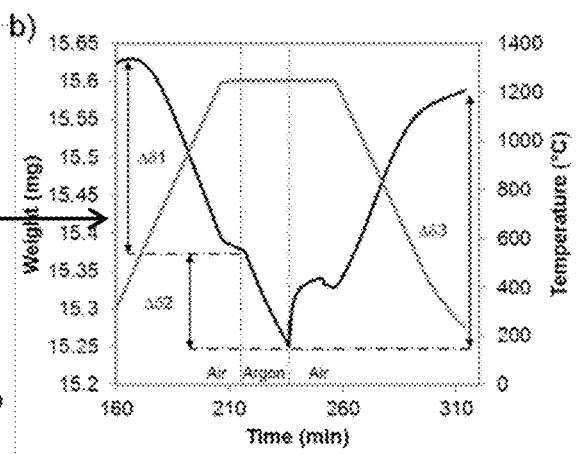

Three Thermogravimetric Analysis (TGA) methods were adopted for this study. The first was a simple prescreen of the redox capacity and reduction onset temperature for each material. This analysis was used to identify the best candidates for more detailed study. The pre-screen was performed using pellet fragments (~15 mg) in a TA Instruments Q600 TG/DSC. FIG. 2A shows the programmed temperature and gas composition profile for the analysis. An initial break-in cycle was performed in air so that all materials begin in a similar state, followed by reduction in air to 1250° C., further reduction in argon, and then re-oxidation in air while cooling to 200° C. FIG. 2B illustrates the notation adopted for changes in oxygen stoichiometry ($\Delta\delta_1$, $\Delta\delta_2$, $\Delta\delta_3$) at each redox stage of the process for a representative sample. For each case, $\Delta\delta$ is calculated as:

$$\Delta\delta = (\Delta m/m_{init}) \cdot (MW_{ABO3}/MW_O) \quad \text{(Eqn. 3)}$$

where $\Delta m$ is the mass change measured by TGA, $m_{init}$ is the initial mass, $MW_{ABO3}$ is the molecular weight of the perovskite assuming that the initial state of the material is the According to another embodiment of the present disclosure, perovskite TCES materials of the formula $La_xSr_{1-x}Co_yM_{1-y}O_{3-\delta}$, where M=Mn or Fe are disclosed. The $La_xSr_{1-x}Co_yMn_{1-y}O_{3-\delta}$ (LSCM) and $La_xSr_{1-x}Co_yFe_{1-y}O_{3-\delta}$ (LSCF) materials may be used for high-temperature TCES. Methods and systems for using LSCM and LSCF materials for high-temperature TCES are also disclosed.

An initial screening of redox activity was completed by TGA for each composition. The most-promising compositions with the greatest recoverable redox capacity for each family were further characterized in equilibrium TGA experiments over a range of temperatures and oxygen partial pressures (FIG. 3). These equilibrium experiments allowed the extraction of thermodynamic parameters for LSCM and LSCF compositions operated in TCES conditions.

A set of LSCM and LSCF compositions were synthesized. All compositions crystallized in the perovskite structure. LSCM compositions were indexed to the tetragonal, cubic, rhombohedral, and orthorhombic crystal structures. LSCF compositions were indexed to either a cubic or rhombohedral structures. FIG. 4 illustrates characteristic XRD patterns of (a) LSCM and (b) LSCF. For both materials sets, increasing La concentrations resulted in a lattice distortion away from the ideal cubic structure. For example, LSCF8228 is rhombohedral, while LSCF2828 is cubic, despite having an identical B-site composition. In contrast, LSCF2882 and LSCF2828, which have identical La content but varying B site compositions, are both cubic. The crystal structure of each composition and preliminary TGA data are reported in Tables 2 and 3.

TABLE 2

Crystallographic and pre-screen redox properties of LSCM compositions

| Composition | >95% Single-phase? | Crystal structure | Reduction onset in air (° C.) | $\Delta\delta_1$ | $\Delta\delta_2$ | $\Delta\delta_3$ |
|---|---|---|---|---|---|---|
| LSCM1991 | Yes | Tetragonal | 432 | 0.25 | 0.12 | 0.32 |
| LSCM1982 | Yes | Tetragonal | 438 | 0.24 | 0.12 | 0.31 |
| LSCM1973 | Yes | Tetragonal | 431 | 0.21 | 0.11 | 0.28 |
| LSCM2891 | Yes | Tetragonal | 425 | 0.25 | 0.11 | 0.33 |
| LSCM2882 | No | Tetragonal | 256 | 0.21 | 0.11 | 0.28 |
| LSCM2873 | Yes | Tetragonal | 395 | 0.23 | 0.12 | 0.31 |
| LSCM3791 | Yes | Cubic | 343 | 0.31 | 0.12 | 0.39 |
| LSCM3782 | Yes | Cubic | 359 | 0.28 | 0.12 | 0.36 |
| LSCM3773 | Yes | Cubic | 358 | 0.23 | 0.12 | 0.31 |
| LSCM4664 | Yes | Cubic | 334 | 0.17 | 0.11 | 0.24 |
| LSCM7337 | Yes | Rhombohedral | 772 | 0.03 | 0.07 | 0.01 |
| LSCM8228 | Yes | Rhombohedral | 932 | 0.02 | 0.05 | −0.007 |
| LSCM8237 | Yes | Rhombohedral | 972 | 0.02 | 0.05 | −0.003 |
| LSCM9119 | Yes | Orthorhombic | 825 | 0.04 | 0.06 | 0.020 |
| LSCM9128 | Yes | Orthorhombic | 834 | 0.02 | 0.05 | −0.002 |
| LSCM9137 | Yes | Orthorhombic | 901 | 0.03 | 0.06 | −0.005 |

TABLE 3

Crystallographic and pre-screen redox properties of LSCF compositions

| Composition | >95% Single-phase? | Crystal structure | Reduction onset in air (° C.) | $\Delta\delta_1$ | $\Delta\delta_2$ | $\Delta\delta_3$ |
|---|---|---|---|---|---|---|
| LSCF1991 | No | Cubic | 406 | 0.23 | 0.09 | 0.31 |
| LSCF1982 | Yes | Cubic | 394 | 0.30 | 0.11 | 0.37 |
| LSCF1973 | Yes | Cubic | 372 | 0.29 | 0.10 | 0.36 |
| LSCF2891 | Yes | Cubic | 369 | 0.31 | 0.11 | 0.38 |
| LSCF2882 | Yes | Cubic | 357 | 0.32 | 0.11 | 0.38 |
| LSCF2873 | No | Cubic | 366 | 0.30 | 0.11 | 0.38 |
| LSCF2828 | Yes | Cubic | 340 | 0.30 | 0.09 | 0.35 |
| LSCF3791 | Yes | Cubic | 352 | 0.30 | 0.12 | 0.38 |
| LSCF3773 | Yes | Cubic | 348 | 0.32 | 0.11 | 0.40 |
| LSCF4691 | Yes | Cubic | 342 | 0.27 | 0.12 | 0.35 |
| LSCF4682 | Yes | Cubic | 332 | 0.28 | 0.12 | 0.36 |
| LSCF4673 | Yes | Cubic | 336 | 0.26 | 0.11 | 0.35 |
| LSCF4646 | Yes | Cubic | 349 | 0.25 | 0.10 | 0.30 |
| LSCF4664 | Yes | Rhombohedral | 342 | 0.26 | 0.11 | 0.32 |
| LSCF5555 | Yes | Rhombohedral | 500 | 0.22 | 0.11 | 0.29 |
| LSCF6446 | Yes | Rhombohedral | 609 | 0.17 | 0.11 | 0.22 |
| LSCF7337 | Yes | Rhombohedral | 736 | 0.10 | 0.10 | 0.19 |
| LSCF8228 | Yes | Rhombohedral | 926 | 0.06 | 0.09 | 0.06 |
| LSCF8237 | Yes | Rhombohedral | 886 | 0.07 | 0.10 | 0.08 |
| LSCF9128 | Yes | Rhombohedral | 1005 | 0.03 | 0.07 | 0.01 |
| LSCF9137 | Yes | Rhombohedral | 970 | 0.04 | 0.08 | 0.03 |

Figure 5A:
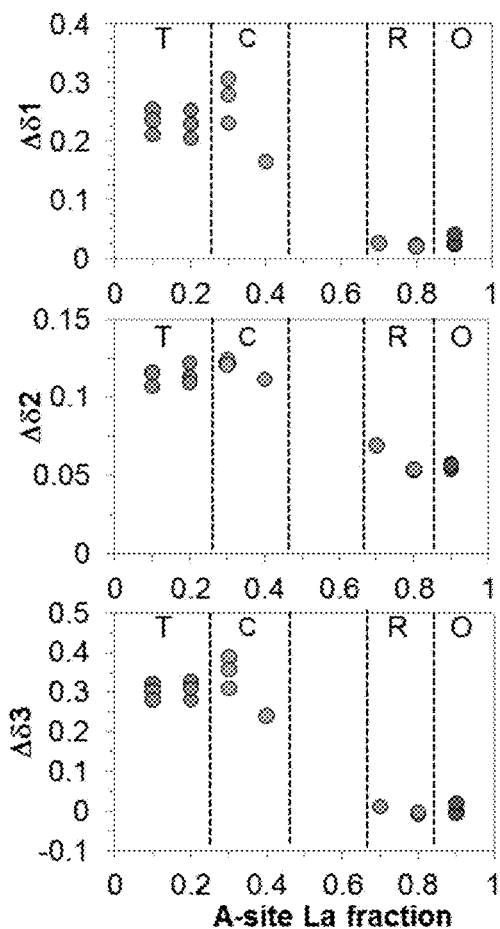
FIG. 5A shows $\Delta\delta_{1-3}$ plotted as a function of A-site La fraction for a sample set of LSCM. Regions marked T, C, R, and O denote tetragonal, cubic, rhombohedral, and orthorhombic phases, respectively.
Figure 5B:
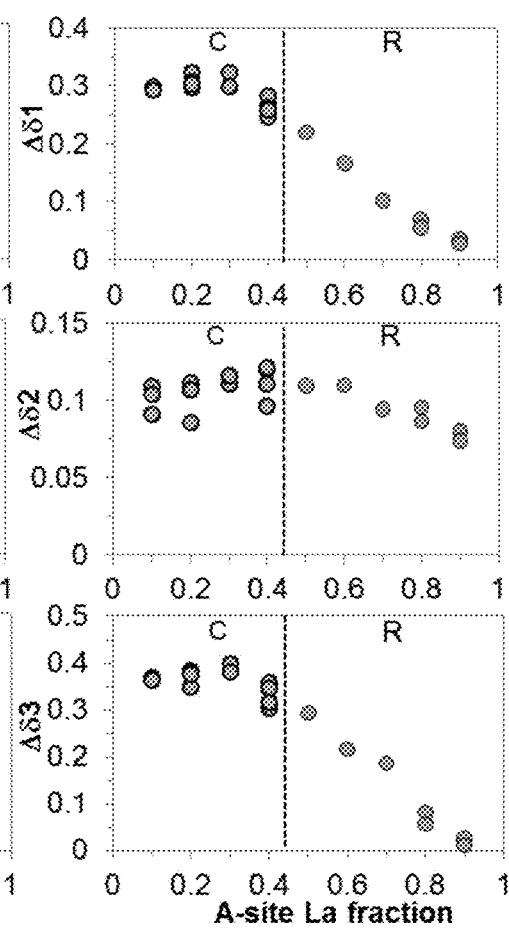
FIG. 5B shows $\Delta\delta_1, \Delta\delta_2,$ and $\Delta\delta_3$ plotted as a function of A-site La fraction for a sample set of LSCF. Regions marked T, C, R, and O denote tetragonal, cubic, rhombohedral, and orthorhombic phases, respectively.

As can be seen in FIGS. 5A and 5B, the crystal structure appears to correlate highly with redox capacity and reduction onset. For both materials sets, the cubic structure exhibits the highest redox capacities closely followed by the tetragonal phase, which is crystallographically similar. The orthorhombic and rhombohedral samples display a larger degree of distortion from the cubic structure and exhibit lower redox activity.

For both compositions, lanthanum concentrations of less than 0.3 result in relatively constant values of $\Delta\delta_{1-3}$. When the La concentration on the A-site exceeds 0.3, the redox performance of the materials decreases significantly (FIGS. 5A and 5B). Additionally, the tight grouping of the data points at each La concentration suggests that the redox properties are only weakly dependent upon the ratio of Co to Mn on the B-site. The strong dependence of structure and redox properties as a function of the A-site La:Sr ratio are likely related.

Figure 6:
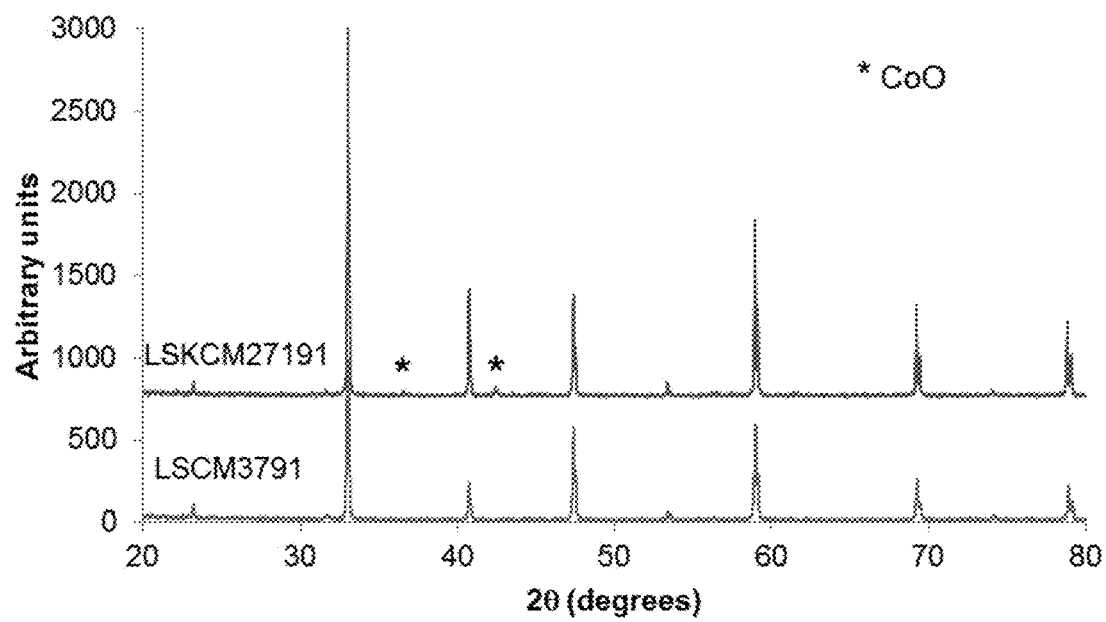
FIG. 6 shows XRD patterns of LSCM3791 and LSKCM27191.

One composition of LSKCM was synthesized, LSKCM27191. This composition is a substitution of potassium for lanthanum resulting in 10% potassium on the A site on the high-performing LSCM3791 material. By comparing these two materials, the effect of potassium doping can be investigated. LSKCM27191 was indexed as cubic, similar to LSCM3791. However, a minor amount of CoO was identified as a second phase, as seen in FIG. 6. However, its performance was good enough to warrant additional experimentation in equilibrium TGA.

Figure 7:
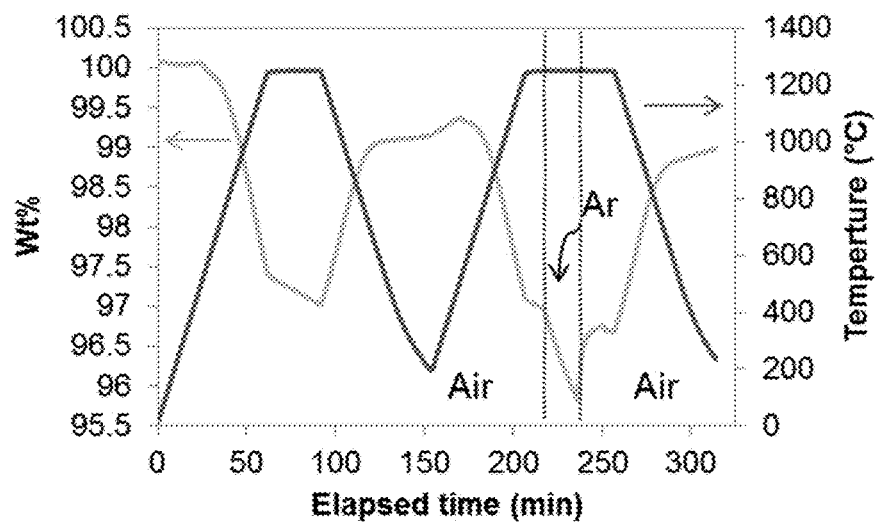
FIG. 7 shows representative prescreen TGA data for $CaAl_{0.2}Mn_{0.8}O_{3-\delta}$.
Figure 8:
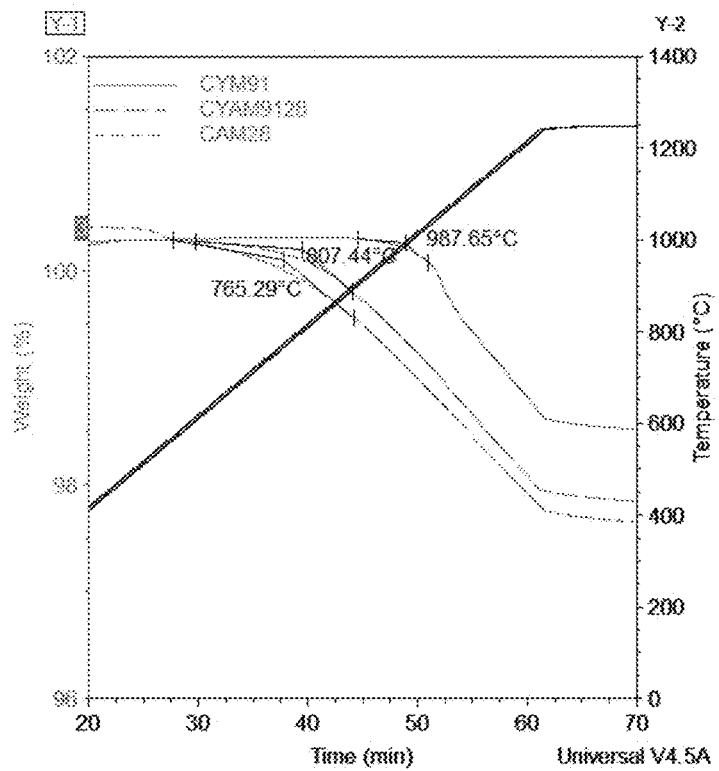
FIG. 8 shows the reduction onset temperature for $CaMnO_3$ materials with partial substitution of Mn with Al and Y. Note that substitution is effectively used to modify the reduction onset temperature.

FIG. 7 shows representative prescreen TGA data for $CaAl_{0.2}Mn_{0.8}O_{3-\delta}$. The material is highly responsive (degree and rate of reduction/oxidation) to changes in both temperature and oxygen partial pressure. Table 4 summarizes the crystal structure and prescreen TGA data for each substituted calcium manganite perovskite material. All materials crystallized in an orthorhombic crystal structure, with very similar a and b lattice parameters, closely relating the structure to tetragonal. A majority of the substituted calcium manganites displayed reduction onset temperatures significantly higher than LSCM/LSCF, while still maintaining acceptable redox capacity ($\Delta\delta_3 > 0.2$). An example of tunable thermodynamic performance through cation substitution is shown in FIG. 8. In this example, changing the cation identity as well as the concentration of each cation results in an increase in the reduction onset temperature. This behavior is indicative of increased reaction enthalpy, and this example illustrates the ability to tune reaction enthalpy and particle reduction temperatures.

$$\Delta H \left[ \frac{kJ}{\text{mol perov}} \right] = \int_{\delta 1}^{\delta 2} \Delta H \left[ \frac{kJ}{\text{mol O}_2} \right] d\delta \left[ \frac{\text{mol O}}{\text{mol perov}} \right] * \frac{1}{2} \left[ \frac{\text{mol O2}}{\text{mol O}} \right] \quad (\text{Eqn. 5})$$

Note that Equation 5 converts the enthalpy units to kJ/mol-perovskite. Dividing by the molecular weight of the

TABLE 4

Crystallography and pre-screen redox properties of CaA'MnB'O$_3$ compositions.

| Composition | >95% Single-phase? | Crystal structure | Reduction onset in air (° C.) | $\Delta\delta_1$ | $\Delta\delta_2$ | $\Delta\delta_3$ |
|---|---|---|---|---|---|---|
| CaMnO$_{3-\delta}$ (CM) | Yes | Orthorhombic | 875 | 0.20 | 0.10 | 0.27 |
| CaTi$_{0.2}$Mn$_{0.8}$O$_{3-\delta}$ (CTM28) | Yes | Orthorhombic | 901 | 0.15 | 0.11 | 0.21 |
| CaTi$_{0.4}$Mn$_{0.6}$O$_{3-\delta}$ (CTM46) | Yes | Orthorhombic | 992 | 0.09 | 0.09 | 0.13 |
| Ca$_{0.8}$La$_{0.2}$Ti$_{0.4}$Mn$_{0.6}$O$_{3-\delta}$ (CLTM8228) | Yes | Orthorhombic | 1020 | 0.05 | 0.10 | 0.09 |
| Ca$_{0.8}$Sr$_{0.2}$Ti$_{0.4}$Mn$_{0.6}$O$_{3-\delta}$ (CSTM8228) | Yes | Orthorhombic | 827 | 0.16 | 0.11 | 0.24 |
| CaCo$_{0.2}$Mn$_{0.8}$O$_{3-\delta}$ (CCM28) | Yes | Orthorhombic | 730 | 0.19 | 0.12 | 0.27 |
| CaFe$_{0.2}$Mn$_{0.8}$O$_{3-\delta}$ (CFM28) | Yes | Orthorhombic | 418 | 0.19 | 0.12 | 0.28 |
| CaFe$_{0.4}$Mn$_{0.6}$O$_{3-\delta}$ (CFM46) | Yes | | 427 | 0.16 | 0.10 | 0.24 |
| CaAl$_{0.2}$Mn$_{0.8}$O$_{3-\delta}$ (CAM28) | Yes | Orthorhombic | 759 | 0.20 | 0.10 | 0.27 |
| Ca$_{0.9}$Y$_{0.1}$MnO$_{3-\delta}$ (CYM91) | Yes | Orthorhombic | 991 | 0.15 | 0.12 | 0.25 |
| Ca$_{0.9}$Y$_{0.1}$Al$_{0.2}$Mn$_{0.8}$O$_{3-\delta}$ (CYAM9128) | Yes | Orthorhombic | 800 | 0.20 | 0.10 | 0.28 |

Figure 9:
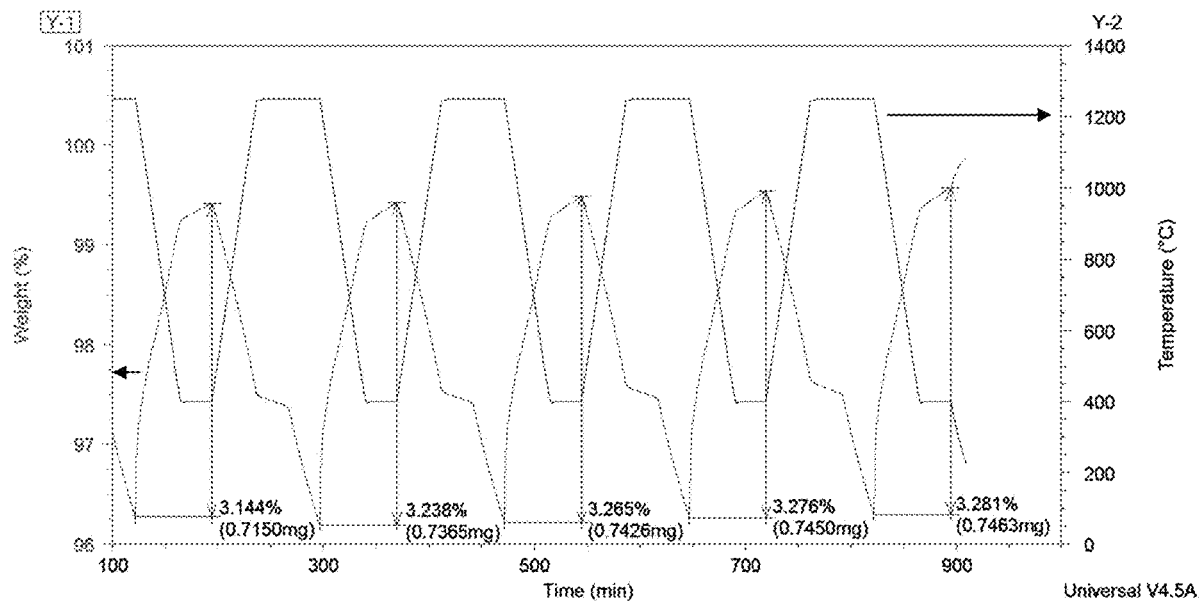
FIG. 9 illustrates consistent reduction/oxidation behavior for LSCM3791 over 5 cycles.

To compare the mean reoxidation magnitude to the minimum desired $\Delta\delta \geq 0.2$, 5 redox cycles were performed on a candidate material, LSCM3791. −200 mesh powder fines were cycled between 1250° C. (60 min hold) and 400° C. (30 min hold), and between gas compositions of dry air and dry argon. The redox data are illustrated in FIG. 9.

As seen in the TGA (FIG. 9), $\Delta\delta$ does not degrade over the five cycles; in fact, it increases slightly. The reoxidation displays a mean magnitude of $\Delta\delta = 0.424$, with a standard deviation of $\sigma_\delta = 0.0071$. It is worth noting that this value is higher than the reported $\Delta\delta_3$ for LSCM3791. This result is due to a difference in dwell times between the two TGA profiles, as the material is allowed longer time to reduce in this experiment.

Figure 10:
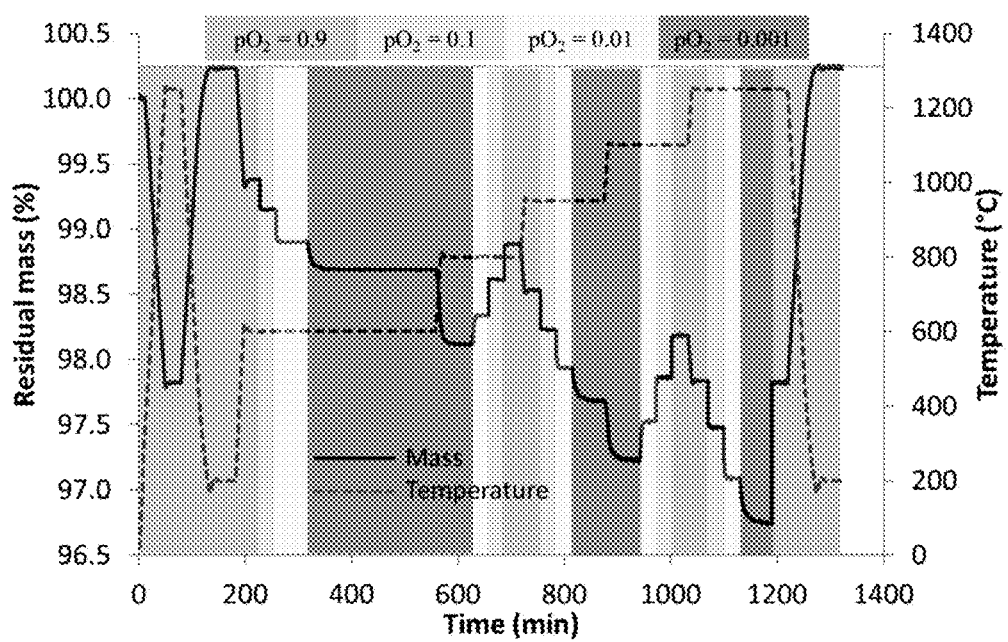
FIG. 10 shows TGA data for LSCM3791 collected using the equilibrium procedure illustrated in FIG. 3.

Reduction enthalpy is measured by evaluating equilibrium TGA data and performing a van't Hoff analysis. Representative TGA data are shown in FIG. 10. The data collected give values for $\delta$ as a function of temperature at each pO$_2$, assuming that the oxygen non-stoichiometry at the starting condition of the experiment is $\delta = 0$.

Figures 11A, 11B:
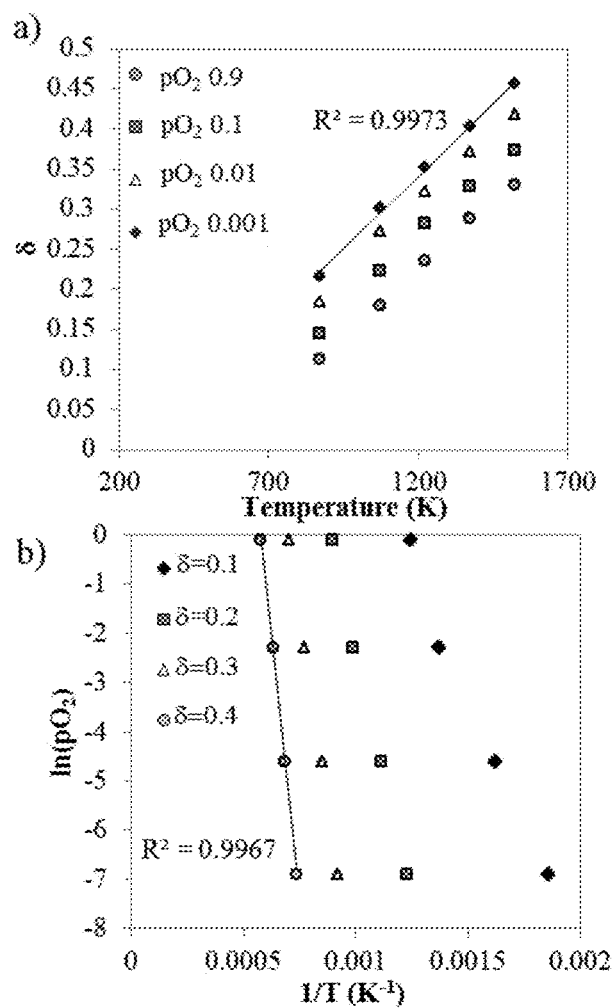
FIGS. 11A and 11B show equilibrium measurements of changes in oxygen stoichiometry in LSCF3773 (A) as a function of temperature for lines of constant oxygen partial pressure and (B) as a function of reciprocal temperature for lines of constant S. First order regressions are shown to demonstrate the linearity of the data.

Results for LSCF3773 obtained by the procedure are shown in FIGS. 11A and 11B. FIG. 11A illustrates the range of equilibrium data acquired and the application of a linear fit to the data. The linear fits can be used to transform the data into van't Hoff form, FIG. 11B. A linear regression of the van't Hoff plot yields an estimation of the enthalpy (slope) and entropy (intercept) of the reduction reaction.

Figure 12A:
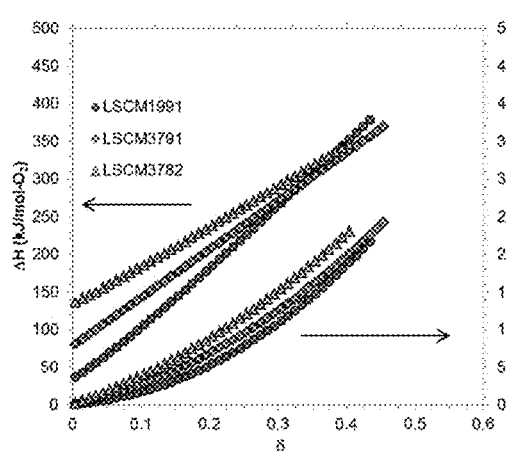
FIG. 12A shows partial molar (left axis) and mass-specific (right axis) enthalpies as a function of $\delta$ for LSCM materials.
Figure 12B:
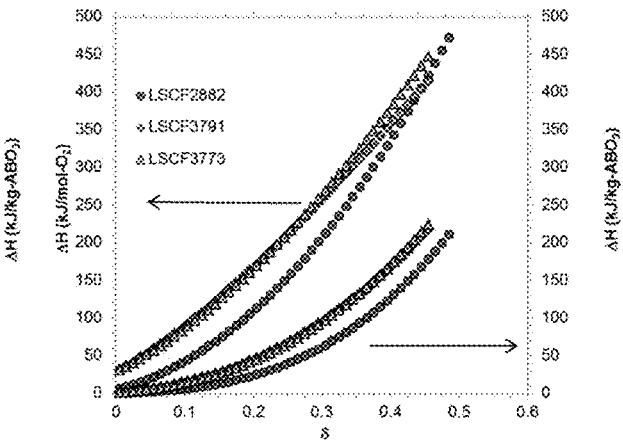
FIG. 12B shows partial molar (left axis) and mass-specific (right axis) enthalpies as a function of $\delta$ for LSCF materials.
Figure 13:
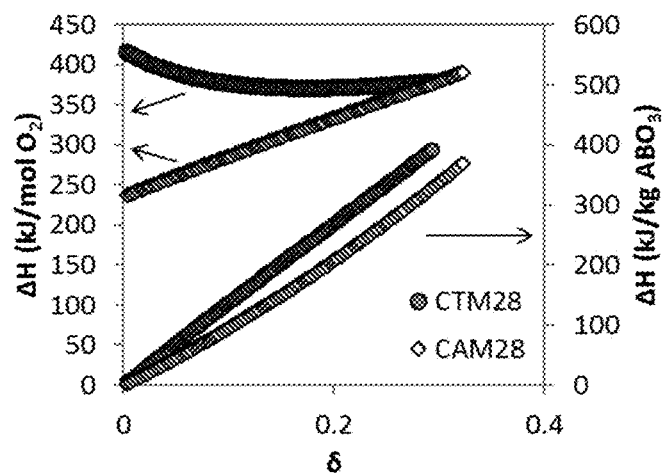
FIG. 13 shows partial molar (left axis) and mass-specific (right axis) enthalpies as a function of $\delta$ for CTM28 and CAM28.

The enthalpies extracted from the van't Hoff data for the LSCM and LSCF compounds can be seen in FIGS. 12A and 12B. Each enthalpy extracted is representative of removing a mole of O$_2$ from the lattice at a specific $\delta$ (left axis). In other words, each data point extracted from the van't Hoff analysis represents a discrete reaction at a specific composition, and a series of these reactions describes the continuous reduction. Therefore, the curve must be integrated to calculate the total enthalpy required to remove all oxygen atoms up to a specific $\delta$, e.g. to generate data such as that shown in FIGS. 1, 12, 13, and 14:

perovskite yields a result in units of the weight-specific enthalpy, kJ/kg-perovskite (right axis of FIGS. 12A and 12B).

The enthalpy data for the LSCM/LSCF candidates plotted in FIGS. 12A and 12B are truncated at the maximum extent of reduction ($\delta_{max}$) measured by the TGA equilibrium experiment. This ensures that the enthalpy is compared for realistically achievable values of $\delta$ for each material. The values for $\delta_{max}$ and the mass specific enthalpy for each composition are listed in Table 5. LSCM3791 displayed the highest enthalpy of the LSCM/LSCF materials families, with a mass-specific enthalpy of 242 kJ/kg.

TABLE 5

Summary of extent of reaction and weight-specific enthalpies for materials tested in the equilibrium TGA experiment

| Material | Reduction onset (° C.) | Maximum $\delta$ | Enthalpy at $\delta_{max}$ (kJ/kg) |
|---|---|---|---|
| LSCM1991 | 432 | 0.434 | 216 |
| LSCM3791 | 343 | 0.460 | 242 |
| LSCM3782 | 359 | 0.412 | 236 |
| LSCF2882 | 357 | 0.486 | 212 |
| LSCF3791 | 352 | 0.461 | 223 |
| LSCF3773 | 348 | 0.455 | 223 |
| LSKCM27191 | 365 | 0.464 | 239 |
| CTM28 | 901 | 0.293 | 393 |
| CAM28 | 759 | 0.322 | 371 |

Although each of the LSCM/LSCF materials has a large range in the maximum extent of reaction ($0.412 < \delta_{max} < 0.486$), the mass-specific enthalpy is fairly consistent (212-242 kJ/kg). Notably, extent of reduction does not necessarily correlate directly with realized reaction enthalpy (storage energy). This is due to a thermodynamic relationship between the oxygen bond strength and the extent of reduction. Materials that are easier to reduce do so because of lesser oxygen bond strengths. It is because of this relationship that we focus on increasing the reduction onset temperature in other compositions.

From FIGS. 12A and 12B, it is clear that LSCF requires less energy to extract oxygen at low $\delta\delta$, i.e. it is easier to reduce, thus storing less heat at lower extent of reduction. However, as $\delta$ increases, LSCF becomes increasingly difficult to reduce and eventually exhibits a higher enthalpy of reduction per mole of oxygen than LSCM. Yet, the larger enthalpy (and thus larger thermal storage) of LSCM at low extents of reduction is of benefit when the enthalpy is summed (integrated) with increasing reduction. When comparing the total enthalpy of the two families (integrated curve, right axis), it becomes apparent that LSCF must reach a higher $\delta$ to store as much latent heat as LSCM. The integrated enthalpy for each composition at its maximum observed $\delta$ ($\delta_{max}$) is listed in Table 6.

TABLE 6

Enthalpy values at maximum reduction of each composition

| Composition | $\delta_{max}$ | $\Delta\delta$(kJ/kg-ABO$_3$) |
|---|---|---|
| LSCM1991 | 0.43 | 220 |
| LSCM3791 | 0.46 | 250 |
| LSCM3782 | 0.41 | 230 |
| LSCF2882 | 0.49 | 210 |
| LSCF3791 | 0.46 | 220 |
| LSCF3773 | 0.45 | 220 |

Figure 14:
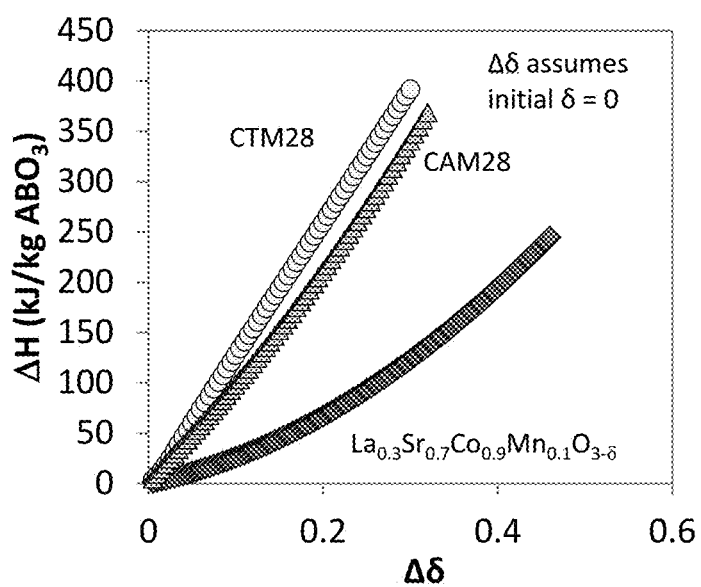
FIG. 14 shows cumulative mass-specific enthalpies as the reaction proceeds from the fully oxidized state ($\delta=0$) to the $\delta$ shown on the x-axis (i.e. $\Delta\delta$) for CTM28, CAM28, and LSCM3791.
Figure 17:
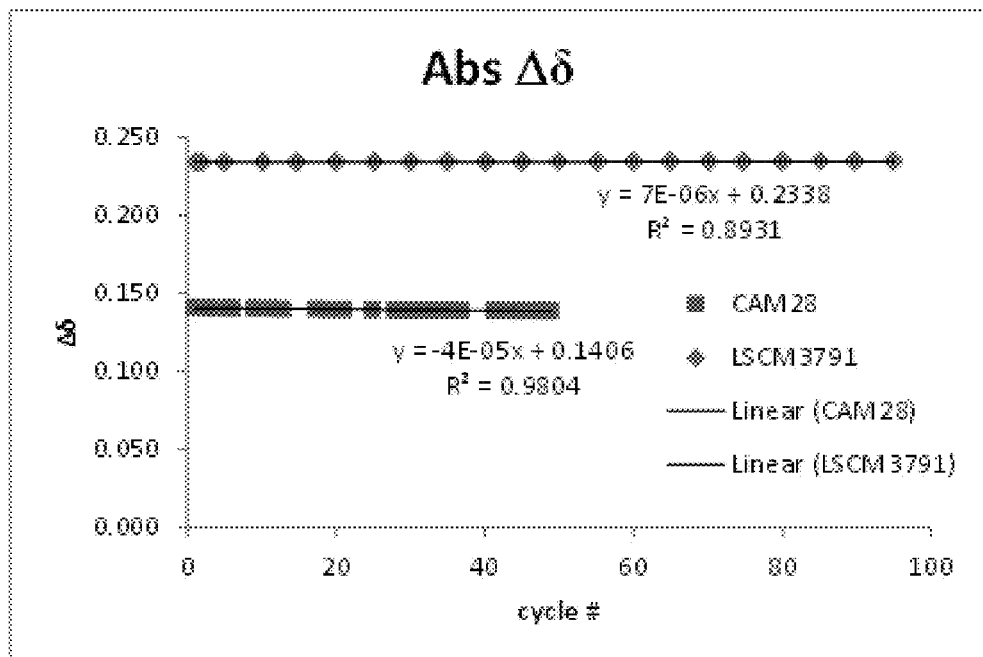
FIG. 17 shows $\Delta\delta$ of LSCM3791 and CAM28 as a function of cycle number.

The calcium manganite materials (CTM28 and CAM28) show higher partial molar enthalpies than LSCM/LSCF (FIG. 13), consistent with the higher reduction onset temperature as previously described. Furthermore, CTM28 outperforms CAM28: the onset temperatures for CTM28 and CAM28 are 901 and 759° C., respectively. CTM28 and CAM28 show a remarkable increase in the mass-specific reduction enthalpy when compared to LSCM3791, as shown in FIG. 14.

Plotting the equilibrium TGA data for LSCM3791 and CTM28 allows visual comparison of the reduction behavior of the two materials, as seen in FIG. 15. While increasing the reduction onset temperature decreased the observed $\delta$ in the samples, the penalty of incomplete reduction was negated by the increase in reduction enthalpy due to the higher temperatures. CTM28 displays a sizable advancement toward the ideal material, although potential for improvement still exists.

An approximation of the heat capacity for each material can be made using the Dulong-Petit formula, which estimates the heat capacity as 3R for each atom in a solid lattice, where R is the ideal gas constant. Since one molecule of perovskite contains 5 atoms, the heat capacity can be estimated as 15R J/mol-K. The units for $C_p$ can be converted into kJ/kg-K by dividing by the molecular weight, as reported in Table 7. Again, the molecular weight has a significant role in the weight-specific heat capacity.

TABLE 7

Approximated heat capacity of candidate materials

| Candidate material | Molecular weight (g/mol) | Approximated $c_p$ (kJ/kg-K) |
|---|---|---|
| LSCM3791 | 209.5 | 0.595 |
| CTM28 | 141.6 | 0.881 |
| CAM28 | 135.8 | 0.918 |

A TA Instruments Discovery TGA, with IR heating capabilities, was used to measure redox extent over multiple cycles. LSCM3971 and CAM28 powders (75-150 μm particle size) were cycled 100 and 50 times, respectively, in air between 400-1050° C. The heating and cooling rates were 400° C./min and 200° C./min, respectively. The dwell time at each temperature was 10 minutes. FIGS. 16A and 16B show the TGA cycles for LSCM3791 and CAM28, respectively. Overall, both materials show consistent behavior over multiple cycles. It is evident that there is a baseline drift during the course of the experiment. However, as both the curves corresponding to $T_{high}$ and $T_{low}$ show similar drift, we can attribute it to instrumental drift, which is not unusual for an experiment of this length. For clarity, the results are shown in terms of $\Delta\delta$. Both samples re-oxidize back to 90% of their original value in under 10 minutes. LSCM3791 re-oxidizes completely in approximately 6 minutes, while CAM28 is >98% re-oxidized (relative to the break-in point) after 10 minutes. Powder XRD of the post-cycled material shows no change in crystal structure compared to the fresh material and scanning electron microscopy (SEM) shows that particle size remains constant, implying a resistance to sintering.

Figure 18:
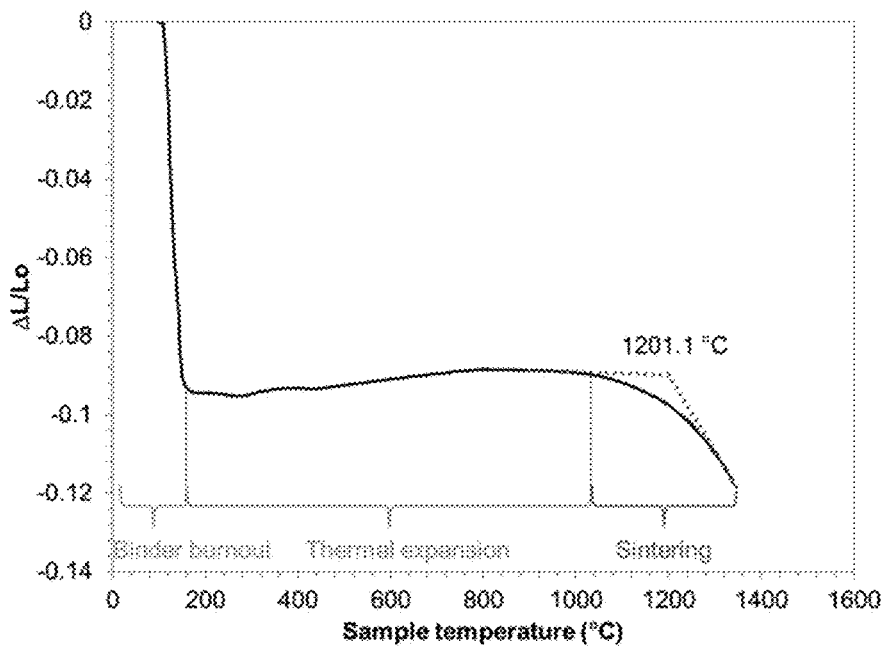
FIG. 18 shows sintering onset determination for LSCM3791.

The data of $\Delta\delta$ as a function of cycle number for both materials are fit to a linear trend. The slope of LSCM is on the order of $10^{-6}$ $\Delta\delta$ per cycle, while that of CAM28 is $-10^{-5}$, $\Delta\delta$ per cycle, indicating a great degree of stability. To examine the sintering potential of the ceramic grains, dilatometry experiments were performed using an XDC-2 prototype dilatometer from Precision Measurements and Instruments Corporation (PMIC). The sintering onset is defined as the intersection of the tangent line before the sintering mechanism begins and the tangent line after the sintering mechanism is active. The samples were made by sieving calcined materials to 75-125 μm. This powder was pressed into a ⅜ inch pellet using 2.5 wt % polyvinyl butyral (PVB) as a binder. The pellet was heated to 1350° C. at 4° C.·min$^{-1}$ in the dilatometer. The dilatometry data exhibits an initial contraction due to binder burnout, followed by a thermal expansion, with sintering beginning to occur after 1000° C. Using the tangent line method, the sintering temperature is measured as 1201.1° C. for LSCM3791, as seen in FIG. 18.

Figure 19:
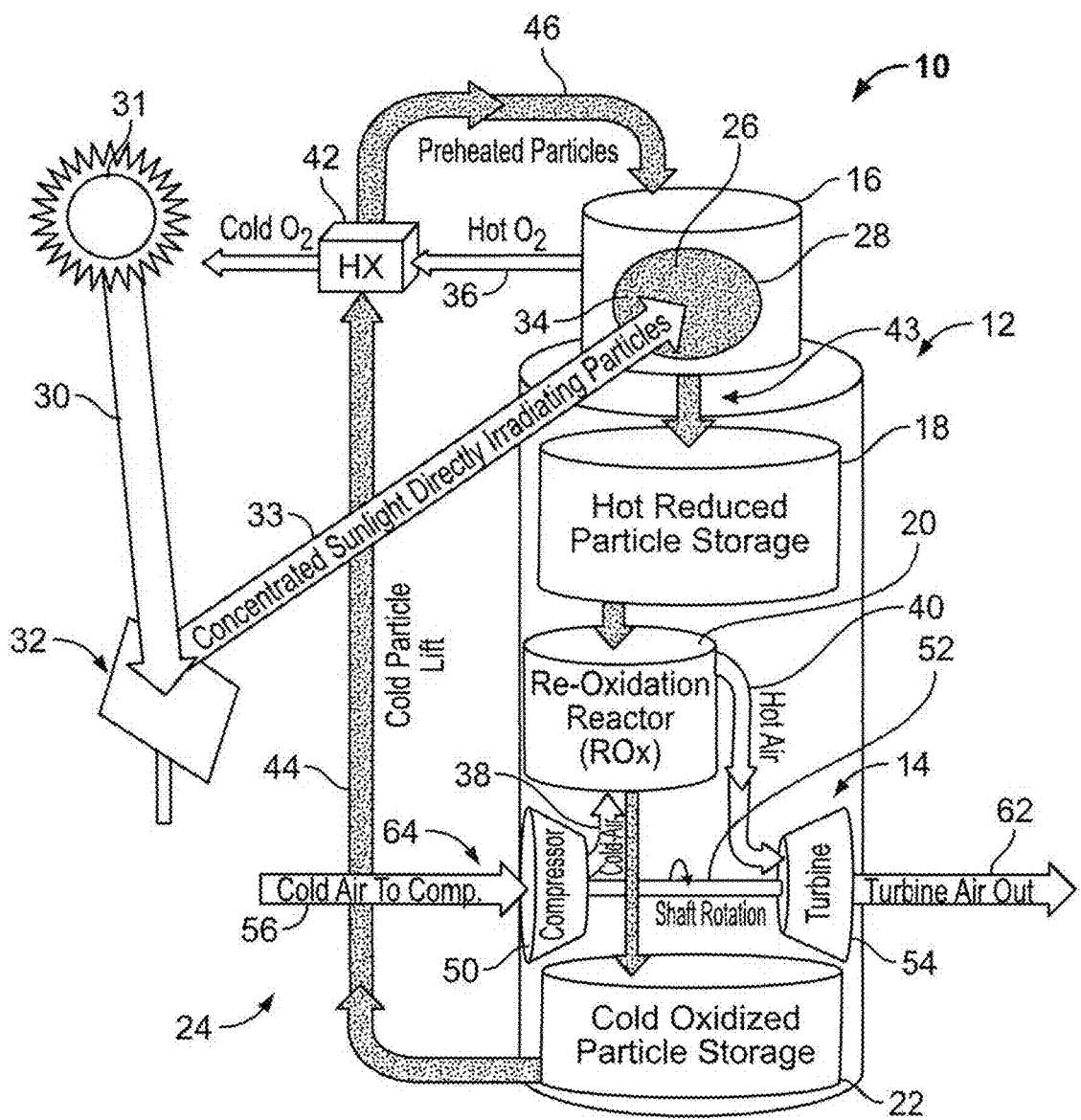
FIG. 19 is an illustration of a solar power system according to an embodiment of the disclosure.

FIG. 19 illustrates an embodiment of a solar power system 10 according to the present invention. The solar power system 10 is capable of storing heat energy via TCES and release system using thermochemically active, metal oxide particles (particles) and using the stored heat energy to drive a power generation system. The metal oxide particles are formed from TCES materials having the formula $A_xA'_{1-x}B_yB'_{1-y}O_{3-\delta}$ (where A=La, Sr, K, Ca, Ba, Y and B=Mn, Fe, Co, Ti, Ni, Cu, Zr, Al, Y, Cr, V, Nb, Mo), and may be selected from the general formula or any of the embodiments disclosed herein. The particles formed of these materials will be referred to as metal oxide particles (particles) from henceforth for brevity.

In FIG. 19, the solar power system 10 includes a TCES and release subsystem 12 and a power generation subsystem 14. The TCES and release subsystem 12 includes a solar receiver reduction reactor (SR3) 16, a hot reduced particle storage vessel 18, a re-oxidation reactor (ROx) 20, a cool or cold oxidized particle storage vessel 22, and a particle transport system 24. The SR3 16 includes a particle reduction chamber (chamber) 26 having an aperture or window 28 for allowing concentrated solar energy to enter the chamber. In such a manner, solar energy 30 from the sun 31 may be concentrated by a one or more heliostats or solar collection system 32, which directs reflected concentrated sunlight 33 into the chamber 26 via the window 28 to heat thermochemically active, metal oxide particles (particles) 34 contained therein. The heated particles undergo a reduction reaction that generates hot $O_2$, which is removed from the SR3 16 via a hot evolved $O_2$ flow 36. The SR3 16 operates at a temperature of between 500 and 1500° C. In an embodiment, the SR3 16 operates at temperatures between 800-1200° C. In another embodiment, the SR3 16 operates at a temperature of between 1000-1100° C.

The hot reduced particle storage vessel 18 is in fluid communication with the SR3 16 via a portion of the gravity feed section 43 (see discussion below). In such a manner, the hot reduced particle storage vessel 18 may receive heated particles discharged from the chamber 26. The hot reduced particle storage vessel 18 stores particles at a temperature of >500° C. In an embodiment, the hot reduced particle storage vessel 18 stores particles at a temperature >1000° C. In another embodiment, the hot reduced particle storage vessel 18 stores particles at a temperature of between 1000 and 1200° C. In another embodiment, the hot reduced particle storage vessel 18 may be bypassed or partially bypassed, and the particles from the SR3 16 may be provided directly to the ROx 20 or stored or some fraction of both.

In an embodiment, the hot reduced particle storage vessel 18 is configured to store particles for a period of time before providing the particles to the ROx 40. In an embodiment, the hot reduced particle storage vessel 18 is configured to store particles for a period greater than 8 hours. In an embodiment, the hot reduced particle storage vessel 18 is configured to store particles for a period greater than 24 hours. In an embodiment, the hot particle storage vessel 18 may be configured to store a portion or the entire inventory of particles within the system.

The ROx 20 is in fluid communication with the hot reduced particle storage vessel 18 via a portion of the gravity feed section 43 (see discussion below). In such a manner, the ROx 20 may receive heated particles discharged from the hot particle storage vessel 18. The ROx 20 receives cold or cooler gas (ROx input gas) 38 and discharges hot gas (discharge gas) 40. In this exemplary embodiment, the ROx input gas 38 is air, however, in other embodiments, the ROx input gas may be air, oxygen, oxygen enriched air or gas, carbon dioxide, or other gas capable of facilitating a thermochemical oxidation reaction. Air (or other fluid) flow will typically de directed in a countercurrent fashion to particle flow through the ROx to maximize heat transfer and the air outlet temperature.

The ROx input gas 38 is provided to the ROx 20 at temperatures between ambient and 600° C. In an embodiment, the ROx input gas 38 may be provided to the ROx 20 at a temperature of between 250 and 500° C. In another embodiment, the ROx input gas 38 may be provided to the ROx 20 at a temperature of between 400 and 500° C.

The discharge gas 40 is discharged from the ROx 20 at temperatures between 500 and 1500° C. In an embodiment, the discharge gas 40 may be discharged from the ROx 20 at a temperature of between 1000-1250° C. In another embodiment, the discharge gas 40 may be discharged from the ROx 20 at a temperature of between 1100 and 1200° C.

The cold oxidized particle storage vessel 22 is decoupled from the fluid stream of the ROx 20 via one or more conduits (not shown). In such a manner, the cold oxidized particle storage vessel 22 may receive cold particles discharged from the ROx 20 without the loss of the fluid through the storage vessel. In another embodiment, the cold oxidized particle storage vessel 22 may be omitted or split into one or more streams so that particles may be stored, sent directly to the SR3 16 or some fraction of both.

In an embodiment, the cold oxidized particle storage vessel 22 is configured to store particles for a period of time before providing the particles to the ROx 20. In an embodiment, the cold oxidized particle storage vessel 22 is configured to store particles for a period greater than 8 hours. In an embodiment, the cold oxidized particle storage vessel 22 is configured to store particles for a period greater than 24 hours. In an embodiment, the cold oxidized particle storage vessel 22 may be configured to store a portion or the entire inventory of particles within the system.

In this exemplary embodiment, the solar power system 10 includes heat exchanger 42. The heat exchanger 42 is in fluid communication with the cold oxidized particle storage vessel 22 via a cold particle lift 44 that is part of the particle transport system 24. In such a manner, the heat exchanger 42 receives cold particles discharged from the cold oxidized particle storage vessel 22. The heat exchanger 42 is also in fluid communication with the hot evolved $O_2$ flow 36 discharged from the SR3 16. The hot $O_2$ exchanges heat with the cold particles which are discharged from the heat exchanger 42 as preheated particles 46, which are fed to the SR3 16. In another embodiment, heat exchanger 42 may be omitted, the particles preheated by another component of the systems, or the cold particles are fed directly to the SR3 16 or any combination thereof.

The particle transport system 24 includes a gravity feed section 43 (indicated by downward pointing arrows) and the cold particle lift 44. The gravity feed section 43 provides fluid connectivity to move particles from the bottom (hot side) of the SR3 16 to the hot reduced particle storage 18, the ROx 20, and the cold oxidized particle storage vessel 22. The gravity feed section 43 includes conduits or piping (not shown) configured to move particles. In another embodiment, the gravity feed section 43 may include, but is not limited to conduits, piping, conveyors, valves, temperature sensors, and motors configured to move particles. In another embodiment, the gravity feed section 43 may be replaced in part or in whole with a mechanical transport device, for example screw feed mechanisms.

The cold particle lift 44 is in fluid connection with and receives cold particles from the cold oxidized particle storage vessel 22. The cold particle lift 44 transports those particles to a heat exchanger 42 where the particles are heated by the hot evolved $O_2$ flow 36 discharged from the SR3 16. Preheated particles 46 are discharged from the heat exchanger 42 and provided to the SR3 16 via a conduit (not shown). Cold $O_2$ that has lost heat to the particles is then discharged from the heat exchanger 42. The cold particle lift 44 may be, but is not limited to, a screw elevator, Olds elevator, conveyor, skip hoist, or other device or mechanism capable of particle transport.

The particle transport system 24 further includes, but is not limited to, conduits, piping, conveyors, valves, temperature sensors, and motors configured to move particles and provide fluid connectivity between the components of the TCES subsystem 12.

The power generation subsystem 14 incudes a compressor 50 mechanically coupled via shaft 52 to turbine 54. The compressor receives input gas 56, compresses the input gas 56, and discharges ROx input gas 38. In this exemplary embodiment, the input gas 56 is air, however, in other embodiments, the input gas 56 may be air, oxygen-enriched air or gas, carbon dioxide, or other gas capable of facilitating a thermochemical oxidation reaction. As appreciated by one of ordinary skill in the art, the ROx 20 provides and receives air from the power generation subsystem 14, and the components, including but not limited to the compressor(s), turbine(s) and other associated components and temperatures are configured and selected in a way that is known to one skilled in the art, including the possibility of internal recuperation and bottoming cycles.

The ROx input gas 38 is provided to the ROx 20 where the ROx input gas reacts with the reduced particles and generates discharge gas 40. The discharge gas 40 discharged from the ROx 20 is provided to the turbine 54 where it is expanded, driving turbine 54. Turbine gas 62 is discharged from the turbine 54. The turbine 54, connected via shaft 52, thus provides power to drive the compressor 50 to compress the turbine inlet gas 56. In other embodiments, the power generation subsystem 14 may be alternately configured, such as by using a turbine-alternator-compressor (TAC) configuration, or other compressor/turbine system as appreciated by one in the art. In an embodiment, the power generation system is part of an Air-Brayton cycle power generation unit.

In an embodiment, cold air 56 is compressed in an air Brayton compressor 50 prior to being fed to the ROx reactor 20. The cool compressed air passed counter-currently to particles fed through the ROx and is heated in the process by the sensible heat of the particles and the reaction exotherm. Because the pO2 is higher than the pO2 during reduction, it is possible for the exotherm to increase the temperature to a value greater than the reduction and storage temperature.

An air transport system 64 is employed to transport the cold air 56, compressed cold air 58, hot air 60 and turbine air 62. The air transport system 64 includes, but is not limited to conduits, piping, conveyors, valves, temperature sensors, and other fluid control devices configured to transport air and provide fluid connectivity between the components of the power generation subsystem 14 and ROx 20.

The system 10 can operate at high energy density thermal storage greater than 450 kJ/kg, which is that of currently-used molten salts. In another embodiment, the system 10 can operate at energy density thermal storage greater than 800 kJ/kg. In another embodiment, the system 10 can operate at energy density thermal storage greater than 1000 kJ/kg. In another embodiment, the system can operate at energy density thermal storage greater than 1200 kJ/kg. In another embodiment, the system can operate at energy density thermal storage greater than 1500 kJ/kg.

In the SR3 16, the thermochemically active particles 34 capture solar energy resulting in a temperature increase (storage of thermal energy). A fraction of the captured energy is converted to stored chemical energy through an endothermic reduction reaction which can be generalized as $MO_x + \Delta H \leftrightarrow MO_{x-\delta} + \delta/2\, O_2(g)$ where $MO_x$ represents TCES materials having the formula $A_xA'_{1-x}B_yB'_{1-y}O_{3-\delta}$, where A=La, Sr, K, Ca, Ba, Y and B=Mn, Fe, Co, Ti, Ni, Cu, Zr, Al, Y, Cr, V, Nb, Mo, which may be selected from the general formula or any of the embodiments disclosed herein. The general formula, $MO_x$ will be used for simplicity for the discussion below.

The SR3 can be embodied in any number of particle receiver designs and may include features such as multi-pass particle circulation and features to increase particle residence time. The SR3 aperture may be configured in any orientation including facing up, facing down, vertical, and so forth. The aperture may be open to environment or windowed, and means may be provided to manipulate the $pO_2$ including vacuum pumps or sweep gasses. The metal oxide particles may flow through the SR3 due to the forces of gravity, mechanically, or otherwise conveyed.

In the ROx 20, the particles 34 pass counter-currently to an air stream which enters as cold air 38 and exits as hot air as sensible heat is transferred, and the heat of reaction is recovered as the particles are reoxidized to their original form. The reaction is generalized as $MO_{x-\delta} + \delta/2\, O_{2(g)} \leftrightarrow MO_x + \Delta H$. Conversely to the air, the particles enter the ROx hot and exit as cool particles.

The invention being thus described; it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

The preceding examples can be repeated with similar success by substituting the generically or specifically operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A thermochemical system, comprising:
   a concentrated solar receiver;
   a thermochemical composition provided to the concentrated solar receiver, the thermochemical composition comprising a material having a formula $Ca_x A'_{1-x} B_y B'_{1-y} O_{3-\delta}$, where $A'_{1-x}$=La, Sr, Ba, Y and B and B'=Mn, Ti, Zr, Al, Cr, Mo, and $0 \leq x \leq 1$, $0 < y < 1$ and $0 \leq \delta \leq 1$.

2. The system of claim 1, wherein and $A'_{1-x}$ is La, Sr or Y.

3. The system of claim 1, wherein $B_y$ is Al or Ti, and $B'_{1-y}$ is Mn.

4. The system of claim 1, wherein the thermochemical composition is selected from a group consisting of:
   $CaTi_{0.2}Mn_{0.8}O_{3-\delta}$
   $CaTi_{0.4}Mn_{0.6}O_{3-\delta}$
   $CaAl_{0.1}Mn_{0.9}O_{3-\delta}$
   $CaAl_{0.2}Mn_{0.8}O_{3-\delta}$
   $CaAl_{0.3}Mn_{0.7}O_{3-\delta}$
   $CaAl_{0.4}Mn_{0.6}O_{3-\delta}$
   $Ca_{0.8}La_{0.2}Ti_{0.2}Mn_{0.8}O_{3-\delta}$
   $Ca_{0.8}Sr_{0.2}Ti_{0.2}Mn_{0.8}O_{3-\delta}$
   $Ca_{0.9}Y_{0.1}Al_{0.2}Mn_{0.8}O_{3-\delta}$
   $Ca_{0.8}Y_{0.2}Al_{0.2}Mn_{0.8}O_{3-\delta}$
   $Ca_{0.9}Y_{0.1}Al_{0.4}Mn_{0.6}O_{3-\delta}$
   $Ca_{0.8}Y_{0.2}Al_{0.4}Mn_{0.6}O_{3-\delta}$
   $CaZr_{0.2}Mn_{0.8}O_{3-\delta}$.

5. A thermochemical system, comprising:
   a concentrated solar receiver;
   a thermochemical composition provided to the concentrated solar receiver, the thermochemical composition comprising a perovskite material selected from the group consisting essentially of a formula $La_{0.2}Sr_{0.7}K_{0.1}Co_{0.9}Mn_{0.1}O_{3-\delta}$, and $La_xSr_{1-x}Co_yMn_{1-y}O_{3-\delta}$ where $0 \leq x < 1$, $0 < y < 1$ and $0 \leq \delta \leq 1$.

6. The system of claim 5, wherein the thermochemical composition is selected from a group consisting of:
   $La_{0.1}Sr_{0.9}Co_{0.9}Mn_{0.1}O_{3-\delta}$
   $La_{0.1}Sr_{0.9}Co_{0.8}Mn_{0.2}O_{3-\delta}$
   $La_{0.1}Sr_{0.9}Co_{0.7}Mn_{0.3}O_{3-\delta}$
   $La_{0.2}Sr_{0.8}Co_{0.9}Mn_{0.1}O_{3-\delta}$
   $La_{0.2}Sr_{0.8}Co_{0.8}Mn_{0.2}O_{3-\delta}$ $La_{0.2}Sr_{0.8}Co_{0.7}Mn_{0.3}O_{3-\delta}$
$La_{0.3}Sr_{0.7}Co_{0.9}Mn_{0.1}O_{3-\delta}$
$La_{0.3}Sr_{0.7}Co_{0.8}Mn_{0.2}O_{3-\delta}$
$La_{0.3}Sr_{0.7}Co_{0.7}Mn_{0.3}O_{3-\delta}$
$La_{0.4}Sr_{0.6}Co_{0.6}Mn_{0.4}O_{3-\delta}$
$La_{0.7}Sr_{0.3}Co_{0.3}Mn_{0.7}O_{3-\delta}$
$La_{0.8}Sr_{0.2}Co_{0.2}Mn_{0.8}O_{3-\delta}$
$La_{0.8}Sr_{0.2}Co_{0.3}Mn_{0.7}O_{3-\delta}$
$La_{0.9}Sr_{0.1}Co_{0.1}Mn_{0.9}O_{3-\delta}$
$La_{0.9}Sr_{0.1}Co_{0.2}Mn_{0.8}O_{3-\delta}$
$La_{0.9}Sr_{0.1}Co_{0.3}Mn_{0.7}O_{3-\delta}$.

7. A method, comprising:
providing a thermochemical material to a concentrated solar receiver, the thermochemical material comprising a perovskite material having a formula $A_xA'_{1-x}B_yB'_{1-y}O_{3-\delta}$, where $A_x=Ca$ and $A'_{1-x}=La$, Sr, K, Ba, Y and $B_y$ and $B'1-y=Mn$, Ti, Ni, Cu, Zr, Al, Y, Cr, V, Nb, Mo, and $0<x\leq1$, $0<y<1$ and $0\leq\delta\leq1$.

8. The method of claim 7, wherein $A'_{1-x}$ is Sr or Y.

9. The method of claim 7, wherein $B_y$ is Al or Ti, and $B'_{1-y}$ is Mn.

10. The method of claim 7, wherein the thermochemical composition is selected from a group consisting of:

$CaTi_{0.2}Mn_{0.8}O_{3-\delta}$
$CaTi_{0.4}Mn_{0.6}O_{3-\delta}$
$CaAl_{0.1}Mn_{0.9}O_{3-\delta}$
$CaAl_{0.2}Mn_{0.8}O_{3-\delta}$
$CaAl_{0.3}Mn_{0.7}O_{3-\delta}$
$CaAl_{0.4}Mn_{0.6}O_{3-\delta}$
$CaCo_{0.2}Mn_{0.8}O_{3-\delta}$
$Ca_{0.8}La_{0.2}Ti_{0.2}Mn_{0.8}O_{3-\delta}$
$Ca_{0.8}Sr_{0.2}Ti_{0.2}Mn_{0.8}O_{3-\delta}$
$Ca_{0.9}Y_{0.1}MnO_{3-\delta}$
$Ca_{0.8}Y_{0.2}MnO_{3-\delta}$
$Ca_{0.7}Y_{0.3}MnO_{3-\delta}$
$Ca_{0.9}Y_{0.1}Al_{0.2}Mn_{0.8}O_{3-\delta}$
$Ca_{0.8}Y_{0.2}Al_{0.2}Mn_{0.8}O_{3-\delta}$
$Ca_{0.9}Y_{0.1}Al_{0.4}Mn_{0.6}O_{3-\delta}$
$Ca_{0.8}Y_{0.2}Al_{0.4}Mn_{0.6}O_{3-\delta}$
$CaZr_{0.2}Mn_{0.8}O_{3-\delta}$.

11. A method, comprising:
providing a thermochemical material to a concentrated solar receiver, the thermochemical material comprising a perovskite material having a formula $La_xSr_{1-x-z}K_zCo_yM_{1-y}O_{3-\delta}$, where $M=Mn$ or $Fe$ and $0<x\leq1$, $0<y<1$, $0<z\leq0.5$ and $0\leq\delta\leq1$.

12. The method of claim 11, wherein the perovskite material is $La_{0.2}Sr_{0.7}K_{0.1}Co_{0.9}Mn_{0.1}O_{3-\delta}$.

13. A thermochemical system, comprising:
a concentrated solar receiver;
a thermochemical composition provided to the concentrated solar receiver,
wherein the thermochemical composition is selected from a group consisting of:

$Ca_{0.9}Y_{0.1}MnO_{3-\delta}$
$Ca_{0.8}Y_{0.2}MnO_{3-\delta}$
$Ca_{0.7}Y_{0.3}MnO_{3-\delta}$.

* * * * *